US012763014B2

(12) United States Patent
Cao et al.

(10) Patent No.: US 12,763,014 B2
(45) Date of Patent: Oct. 13, 2026

(54) PIXEL DRIVING CIRCUIT, DRIVING METHOD THEREOF AND DISPLAY PANEL

(71) Applicants: Chengdu BOE Optoelectronics Technology Co., Ltd., Chengdu (CN); BOE Technology Group Co., Ltd., Beijing (CN)

(72) Inventors: Xilei Cao, Beijing (CN); Dongfang Yang, Beijing (CN); Zhenhua Zhang, Beijing (CN); Li Zhu, Beijing (CN); Xiaoxin Li, Beijing (CN); Jingyi Feng, Beijing (CN)

(73) Assignees: Chengdu BOE Optoelectronics Technology Co., Ltd., Chengdu (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/284,243

(22) PCT Filed: Jul. 29, 2022

(86) PCT No.: PCT/CN2022/108799
§ 371 (c)(1),
(2) Date: Sep. 26, 2023

(87) PCT Pub. No.: WO2023/011333
PCT Pub. Date: Feb. 9, 2023

(65) Prior Publication Data

US 2024/0169915 A1 May 23, 2024

(30) Foreign Application Priority Data

Aug. 5, 2021 (CN) ......................... 202110897040.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC .................................................... G09G 3/3233
See application file for complete search history.

(56) References Cited

U.S. PATENT DOCUMENTS 11,004,385 B1 * 5/2021 Li ........................ G09G 3/3233
2018/0190185 A1 * 7/2018 Ko ....................... G09G 3/3233
(Continued)

FOREIGN PATENT DOCUMENTS

CN 105810151 A 7/2016
CN 107086227 A 8/2017
(Continued)

OTHER PUBLICATIONS

China Patent Office, CN202110897040.0 First Office Action issued on Feb. 24, 2022.

(Continued)

*Primary Examiner* — Bipin Gyawali
(74) *Attorney, Agent, or Firm* — HOUTTEMAN LAW LLC

(57) ABSTRACT

A pixel driving circuit, a method for driving the same, and a display panel are provided. The pixel driving circuit includes a driving circuit (1) and an initialization circuit (2). The driving circuit (1) is connected to a first node (N1), a second node (N2), and a third node (N3). The initialization circuit (2) is connected to the first node (N1), the initialization circuit (2) is further connected to the second node (N2) and/or the third node (N3), and the initialization circuit (2) is configured to provide a first initialization voltage to the first node (N1), provide a first reset voltage to the second node (N2) and/or provide a second reset voltage to the third (Continued)

node (N3), so as to control a driving transistor (T3) in the driving circuit (1) to be turned on.

20 Claims, 16 Drawing Sheets

(52) U.S. Cl.
CPC ............... *G09G 2320/0247* (2013.01); *G09G 2320/0257* (2013.01)

(56) References Cited

U.S. PATENT DOCUMENTS

| | | | | |
|---|---|---|---|---|
| 2018/0211630 | A1* | 7/2018 | Kato | G09G 3/3614 |
| 2019/0114966 | A1* | 4/2019 | Park | G09G 3/3233 |
| 2019/0130833 | A1* | 5/2019 | Gao | G09G 3/3291 |
| 2019/0164500 | A1* | 5/2019 | Shi | G09G 3/3258 |
| 2019/0304371 | A1* | 10/2019 | Li | G09G 3/3258 |
| 2021/0090494 | A1 | 3/2021 | Hwang et al. | |
| 2021/0287614 | A1* | 9/2021 | Xiong | G09G 3/3291 |
| 2021/0407386 | A1* | 12/2021 | Li | G09G 3/3291 |
| 2022/0066587 | A1* | 3/2022 | Kang | G06F 3/04166 |
| 2022/0199024 | A1* | 6/2022 | Zhang | G09G 3/3233 |
| 2022/0343853 | A1* | 10/2022 | Gao | H10K 59/1213 |
| 2023/0274692 | A1* | 8/2023 | Su | G09G 3/32 345/55 |
| 2024/0119897 | A1* | 4/2024 | Zhang | G09G 3/32 |
| 2024/0215366 | A1* | 6/2024 | Liu | H10K 59/1213 |
| 2024/0339077 | A1* | 10/2024 | Li | G09G 3/3208 |

FOREIGN PATENT DOCUMENTS

| | | | |
|---|---|---|---|
| CN | 107342051 | A | 11/2017 |
| CN | 107358915 | A | 11/2017 |
| CN | 107452334 | A | 12/2017 |
| CN | 109817165 | A | 5/2019 |
| CN | 109887464 | A | 6/2019 |
| CN | 110660829 | A | 1/2020 |
| CN | 111627391 | A | 9/2020 |
| CN | 111681604 | A | 9/2020 |
| CN | 111754939 | A | 10/2020 |
| CN | 112509517 | A | 3/2021 |
| CN | 112837651 | A | 5/2021 |
| CN | 113129818 | A | 7/2021 |
| CN | 113851082 | A | 12/2021 |
| JP | 2020112795 | A | 7/2020 |
| KR | 20150064543 | A | 6/2015 |
| KR | 102035302 | B1 | 10/2019 |
| KR | 20210046910 | A | 4/2021 |

OTHER PUBLICATIONS

China Patent Office, CN202110897040.0 Second Office Action issued on Apr. 24, 2022.

* cited by examiner

PIXEL DRIVING CIRCUIT, DRIVING METHOD THEREOF AND DISPLAY PANEL

CROSS-REFERENCE TO RELATED APPLICATIONS

This is a National Phase Application filed under 35 U.S.C. 371 as a national stage of PCT/CN2022/108799 filed on Jul. 29, 2022, an application claiming priority to Chinese patent application No. 202110897040.0, filed on Aug. 5, 2021, the entire content of each of which is incorporated herein by reference.

TECHNICAL FIELD

The present disclosure relates to the field of display technology, and in particular, to a pixel driving circuit, a driving method thereof, and a display panel.

BACKGROUND

When an existing pixel driving circuit operates at a low frequency, a threshold voltage of a driving transistor of the existing pixel driving circuit is severely drifted due to bias stress, causing difficulty in subsequent compensating the threshold voltage of the driving transistor, which will result in nonuniform display brightness across the whole display panel. Meanwhile, the severe drifting of the threshold voltage of the driving transistor will result in a severe hysteresis effect, thereby causing defects such as ghosting (which may also be referred to as “image sticking”) and flickering.

SUMMARY

In a first aspect, embodiments of the present disclosure provide a pixel driving circuit, including: a driving circuit and an initialization circuit;

wherein the driving circuit is connected to a first node, a second node, and a third node; and wherein the initialization circuit is connected to the first node, the initialization circuit is further connected to the second node and/or the third node, and the initialization circuit is configured to provide a first initialization voltage to the first node, provide a first reset voltage to the second node and/or provide a second reset voltage to the third node, so as to control a driving transistor in the driving circuit to be turned on.

In some embodiments, the driving circuit includes the driving transistor; and the driving transistor includes a control electrode connected to the first node, a first electrode connected to the second node, and a second electrode connected to the third node.

In some embodiments, the initialization circuit includes a first reset circuit;

the first reset circuit is connected to a first control signal terminal, the first node, and a first voltage supply terminal, and configured to transmit the first initialization voltage provided from the first voltage supply terminal to the first node in response to control of a signal of the first control signal terminal;

the initialization circuit further includes a second reset circuit and/or a fourth reset circuit;

the second reset circuit is connected to a second control signal terminal, the second node, and a second voltage supply terminal, and is configured to transmit the first reset voltage provided from the second voltage supply terminal to the second node in response to control of a signal of the second control signal terminal; and the fourth reset circuit is connected to a third control signal terminal, the third node, and a third voltage supply terminal, and is configured to transmit the second reset voltage provided from the third voltage supply terminal to the third node in response to control of a signal of the third control signal terminal.

In some embodiments, the first reset circuit includes a first transistor; and the first transistor includes a control electrode connected to the first control signal terminal, a first electrode connected to the first voltage supply terminal, and a second electrode connected to the first node.

In some embodiments, the first transistor is a metal oxide transistor.

In some embodiments, the second reset circuit includes an eighth transistor; and the eighth transistor includes a control electrode connected to the second control signal terminal, a first electrode connected to the second voltage supply terminal, and a second electrode connected to the second node.

In some embodiments, the fourth reset circuit includes a ninth transistor; and the ninth transistor includes a control electrode connected to the third control signal terminal, a first electrode connected to the third voltage supply terminal, and a second electrode connected to the third node.

In some embodiments, the first voltage supply terminal is connected to a first initialization voltage supply line, and the first control signal terminal is connected to a second reset control signal line;

in a case where the initialization circuit includes the second reset circuit, the second voltage supply terminal is connected to a first reset voltage supply line, and the second control signal terminal is connected to the second reset control signal line; and in a case where the initialization circuit includes the fourth reset circuit, the third voltage supply terminal is connected to a second reset voltage supply line, and the third control signal terminal is connected to the second reset control signal line.

In some embodiments, the pixel driving circuit further includes a data writing circuit and a threshold compensation circuit;

wherein the data writing circuit is connected to a first preset node, a data signal terminal and a gate driving signal terminal, and configured to write a data voltage provided by the data signal terminal to the first preset node in response to control of a signal of the gate driving signal terminal;

wherein the threshold compensation circuit is connected to a second preset node, the first node and the gate driving signal terminal, and configured to connect the second preset node to the first node in response to the control of the signal of the gate driving signal terminal; and wherein one of the first preset node and the second preset node is the second node, and the other of the first preset node and the second preset node is the third node.

In some embodiments, the threshold compensation circuit includes a second transistor, and the data writing circuit includes a fourth transistor;

the second transistor includes a control electrode connected to the gate driving signal terminal, a first electrode connected to the first node, and a second electrode connected to the second preset node; and the fourth transistor includes a control electrode connected to the gate driving signal terminal, a first electrode connected to the data signal terminal, and a second electrode connected to the first preset node.

In some embodiments, the first voltage supply terminal is connected to a first initialization voltage supply line, and the first control signal terminal is connected to a second reset control signal line; and the initialization circuit includes the second reset circuit, the second voltage supply terminal is connected to the first node, and the second control signal terminal is connected to a first reset control signal line.

In some embodiments, the first voltage supply terminal is connected to the second node, and the first control signal terminal is connected to a first reset control signal line; and the initialization circuit includes the second reset circuit, the second voltage supply terminal is connected to a first power supply terminal, and the second control signal terminal is connected to a second reset control signal line.

In some embodiments, the pixel driving circuit further includes a data writing circuit;

wherein the data writing circuit is connected to the third node, a data signal terminal and a gate driving signal terminal, and is configured to write a data voltage provided by the data signal terminal to the third node in response to control of a signal of the gate driving signal terminal.

In some embodiments, the data writing circuit includes a fourth transistor; and the fourth transistor includes a control electrode connected to the gate driving signal terminal, a first electrode connected to the data signal terminal, and a second electrode connected to the third node.

In some embodiments, the pixel driving circuit further includes a control circuit and a coupling circuit;

wherein the control circuit is connected to an enabling signal terminal, a second power supply terminal, the second node, the third node and a fourth node, and is configured to transmit a power supply voltage provided by the second power supply terminal to the second node and to connect the third node to the fourth node, in response to control of a signal of the enabling signal terminal; and wherein the coupling circuit is connected between the first node and the fourth node.

In some embodiments, the control circuit includes a fifth transistor and a sixth transistor, and the coupling circuit including a capacitor;

the fifth transistor includes a control electrode connected to the enabling signal terminal, a first electrode connected to the second power supply terminal, and a second electrode connected to the second node;

the sixth transistor includes a control electrode connected to the enabling signal terminal, a first electrode connected to the third node, and a second electrode connected to the fourth node; and the capacitor includes a first terminal connected to the first node, and a second terminal connected to the fourth node.

In some embodiments, the pixel driving circuit further includes a third reset circuit;

wherein the third reset circuit is connected to a first reset control signal line, a second initialization voltage supply line and the fourth node, and is configured to transmit a second initialization voltage supplied from the second initialization voltage supply line to the fourth node in response to control of a signal of the second reset control signal line.

In some embodiments, the third reset circuit includes a seventh transistor; and the seventh transistor includes a control electrode connected to the first reset control signal line, a first electrode connected to the second initialization voltage supply line, and a second electrode connected to the fourth node.

In some embodiments, the seventh transistor is a metal oxide transistor.

In some embodiments, the driving transistor is a top-gate type transistor, the top-gate type transistor is configured with a conductive light shielding pattern, the conductive light shielding pattern is located on a side, which is distal to a control electrode of the top-gate type transistor, of an active layer of the top-gate type transistor, and an orthogonal projection of the conductive light shielding pattern on a plane where the active layer is located completely covers a channel region of the active layer; and the conductive light shielding pattern is connected to the control electrode of the top-gate type transistor or a fourth power supply terminal.

In a second aspect, the embodiments of the present disclosure further provide a method for driving a pixel driving circuit, wherein the pixel driving circuit is the pixel driving circuit according to any one of the embodiments of the first aspect, and the method includes:

in a reset phase, providing, by the initialization circuit, the first initialization voltage to the first node, while providing, by the initialization circuit, the first reset voltage to the second node and/or the second reset voltage to the third node, so as to control the driving transistor in the driving circuit to be turned on.

In a third aspect, the embodiments of the present disclosure further provide a display panel, which includes the pixel driving circuit according to any one of the embodiments of the first aspect.

DETAILED DESCRIPTION OF EMBODIMENTS

Figure 1:
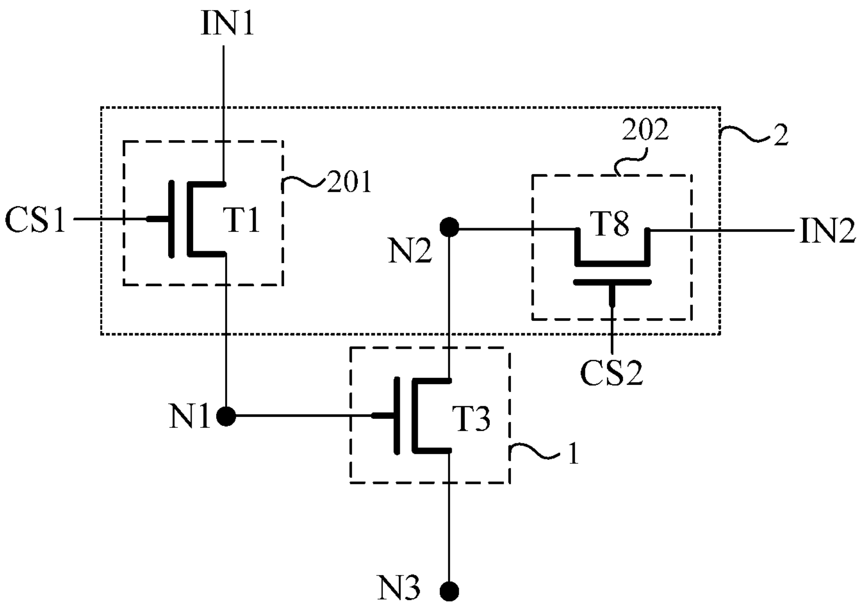
FIG. 1 is a schematic diagram showing a circuit structure of a pixel driving circuit according to an embodiment of the present disclosure.

To make one of ordinary skill in the art better understand technical solutions of the present disclosure, a pixel driving circuit, a driving method thereof, and a display panel provided by the present disclosure will be described in detail below with reference to the accompanying drawings.

To make the objects, technical solutions and advantages of embodiments of the present disclosure more apparent, the technical solutions of the embodiments of the present disclosure will be clearly and completely described below with reference to the drawings showing the embodiments of the present disclosure. It is to be understood that the described embodiments are only a few embodiments, but not all embodiments, of the present disclosure. Further, the embodiments and features of the embodiments of the present disclosure may be combined with each other in a case of no explicit conflict. All other embodiments, which can be derived by one of ordinary skill in the art from the described embodiments of the present disclosure without an inventive effort, fall within the scope of protection of the present disclosure.

Unless defined otherwise, technical or scientific terms used herein shall have the ordinary meaning as understood by one of ordinary skill in the art to which this disclosure belongs. The terms of "first", "second", and the like used in this disclosure are not intended to indicate any order, quantity, or importance, but rather are used for distinguishing one element from another. The term of "comprising", "including", or the like, means that the element or item preceding the term contains the element or item listed after the term and its equivalent, but does not exclude the presence of other elements or items. The term "connected", "coupled", or the like is not limited to physical or mechanical connections, but may include electrical connections, whether direct or indirect connections.

It should be noted that the transistors used in the embodiments of the present disclosure may be thin film transistors, or may be field effect transistors or other devices with the same and similar characteristics. Since a source electrode and a drain electrode of each of the transistors used are symmetrical, there is no difference between the source electrode and the drain electrode. In the embodiments of the present disclosure, to distinguish the source electrode and the drain electrode of each transistor, one of the source electrode and the drain electrode is referred to as a first electrode, the other of the source electrode and the drain electrode is referred to as a second electrode, and a gate electrode of each transistor is referred to as a control electrode. In addition, the transistors may be classified as N-type transistors and P-type transistors according to the characteristics of the transistors. In a case where the N-type transistors are adopted, the first electrode may be the drain electrode of each N-type transistor, and the second electrode may be the source electrode of each N-type transistor. The situation of each P-type transistor is opposite to that of each N-type transistor. An "active level" (or "valid level") in this disclosure refers to a voltage level that can control a corresponding transistor to be turned on. Specifically, for an N-type transistor, the corresponding active level is a high level, and for a P-type transistor, the corresponding active level is a low level.

Figure 2:
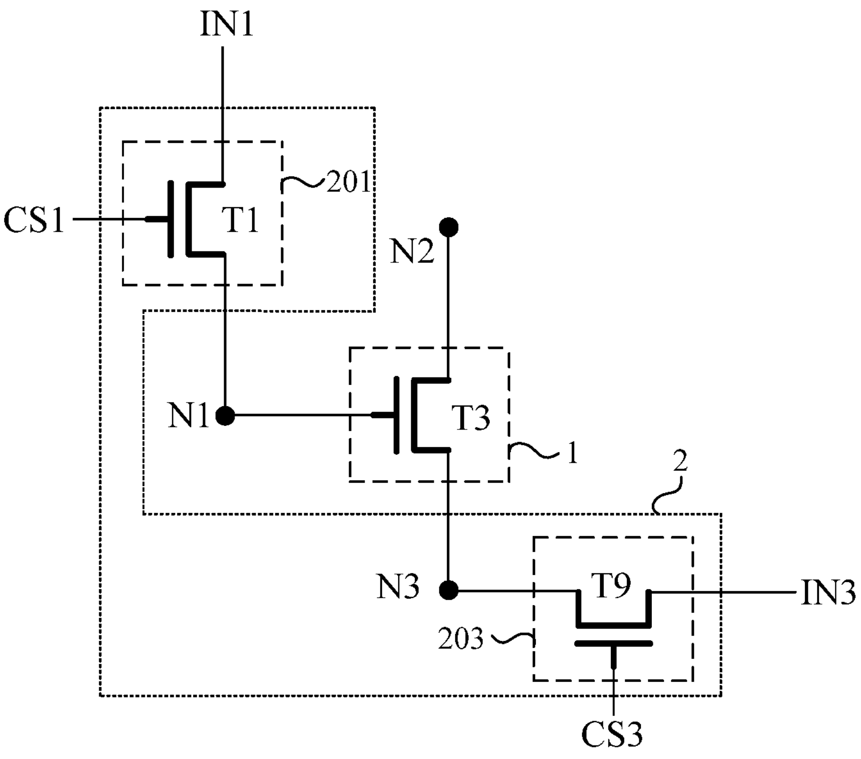
FIG. 2 is a schematic diagram of a circuit structure of another pixel driving circuit according to an embodiment of the present disclosure.
Figure 3:
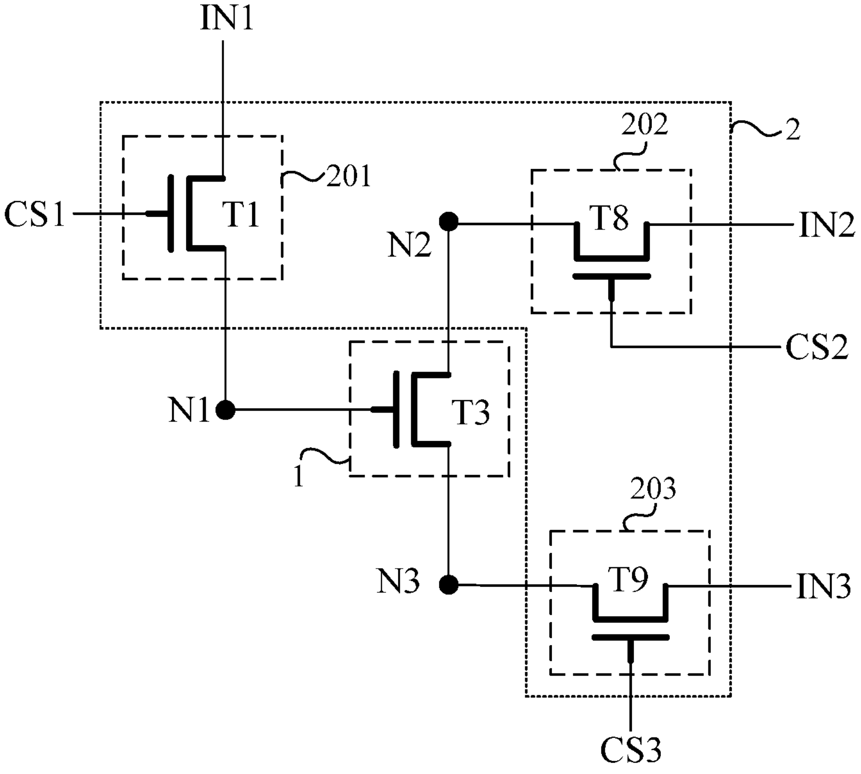
FIG. 3 is a schematic diagram of a circuit structure of another pixel driving circuit according to an embodiment of the present disclosure.

FIG. 1 is a schematic diagram showing a circuit structure of a pixel driving circuit according to an embodiment of the present disclosure. FIG. 2 is a schematic diagram of a circuit structure of another pixel driving circuit according to an embodiment of the present disclosure. FIG. 3 is a schematic diagram of a circuit structure of another pixel driving circuit according to an embodiment of the present disclosure. As shown in FIGS. 1 to 3, the pixel driving circuit includes a driving circuit 1 and an initialization circuit 2. The driving circuit 1 is connected to a first node N1, a second node N2 and a third node N3. The initialization circuit 2 is connected to the first node N1, and is further connected to the second node N2 and/or the third node N3. The initialization circuit 2 is configured to provide a first initialization voltage to the first node N1, provide a first reset voltage to the second node N2 and/or provide a second reset voltage to the third node N3 to control a driving transistor T3 in the driving circuit 1 to be turned on.

FIG. 1 illustrates a case where the initialization circuit 2 is connected to the first node N1 and the second node N2, and FIG. 2 illustrates a case where the initialization circuit 2 is connected to the first node N1 and the third node N3. FIG. 3 illustrates a case where the initialization circuit 2 is connected to the first node N1, the second node N2, and the third node N3.

In an embodiment of the present disclosure, when the pixel driving circuit operates in a reset phase, the initialization circuit 2 provides the first initialization voltage to the first node N1, and at the same time, the initialization circuit 2 provides the first reset voltage to the second node N2 and/or provides the second reset voltage to the third node N3, to control the driving transistor T3 in the driving circuit to be turned on and operate in a saturation region. In the reset phase, since the driving transistor T3 is in a turn-on state, the influence of the hysteresis effect can be reduced. Meanwhile, since the driving transistor T3 is also operated in the saturation region, a degree of the threshold voltage drift of the driving transistor T3 can be reduced. Therefore, the above technical solution of the present disclosure can effectively reduce the degree of the threshold voltage drift of the driving transistor T3 and the influence of the hysteresis effect, thereby effectively improving the problems of ghosting and flickering of a display panel.

In some embodiments, the driving circuit 1 includes the driving transistor T3. The driving transistor T3 includes a control electrode connected to the first node N1, a first electrode connected to the second node N2, and a second electrode connected to the third node N3. The driving transistor T3 may be an N-type transistor, and for example, the driving transistor T3 is a metal oxide transistor. The driving transistor T3 may output a driving current according to a voltage difference between the first node N1 and the third node N3. Alternatively, the driving transistor T3 in an embodiment of the present disclosure may be a P-type transistor. In addition, the driving circuit may alternatively include a plurality of driving transistors T3, and the plurality of driving transistors T3 may be connected in parallel between the second node N2 and the third node N3.

Referring to FIGS. 1 to 3, in some embodiments, the initialization circuit 2 includes a first reset circuit 201. The first reset circuit 201 is connected to a first control signal terminal CS1, the first node N1, and a first voltage supply terminal IN1, and is configured to, in response to control of a signal of the first control signal terminal CS1, transmit the first initialization voltage supplied from the first voltage supply terminal IN1 to the first node N1.

Referring to FIGS. 1 and 3, in some embodiments, the initialization circuit 2 may further include a second reset circuit 202. The second reset circuit 202 is connected to a second control signal terminal CS2, the second node N2, and a second voltage supply terminal IN2, and is configured to, in response to control of a signal of the second control signal terminal CS2, transmit the first reset voltage supplied from the second voltage supply terminal IN2 to the second node N2.

Referring to FIGS. 2 and 3, the initialization circuit 2 may further include a fourth reset circuit 203. The fourth reset circuit 203 is connected to a third control signal terminal CS3, the third node N3, and a third voltage supply terminal IN3, and is configured to, in response to control of a signal of the third control signal terminal CS3, transmit the second reset voltage supplied from the third voltage supply terminal IN3 to the third node N3.

The case where the initialization circuit 2 includes the first reset circuit 201 and the second reset circuit 202 is illustrated in FIG. 1. The case where the initialization circuit 2 includes the first reset circuit 201 and the fourth reset circuit 203 is illustrated in FIG. 2. The case where the initialization circuit 2 includes the first reset circuit 201, the second reset circuit 202, and the fourth reset circuit 203 is illustrated in FIG. 3.

It should be noted that in order to ensure that the driving transistor T3 is in the turn-on state and operates in the saturation region, when the initialization circuit 2 provides the first initialization voltage to the first node N1 and the initialization circuit 2 provides the first reset voltage to the second node N2 and/or provides the second reset voltage to the third node N3, a gate-source voltage Vgs of the driving transistor T3 is greater than Vth, i.e., Vgs>Vth, and a gate-drain voltage Vgd of the driving transistor T3 is less than Vth, where Vth is a threshold voltage of the driving transistor T3. That is, the voltage difference between the first node N1 and the third node N3 is greater than the threshold voltage of the driving transistor T3, and a voltage difference between the first node N1 and the second node N2 is less than the threshold voltage of the driving transistor T3. Detailed description will be provided later in detail with reference to some specific examples.

Referring to FIGS. 1 to 3, in some embodiments, the first reset circuit 201 includes a first transistor T1. The first transistor T1 includes a control electrode connected to the first control signal terminal CS1, a first electrode connected to the first voltage supply terminal IN1, and a second electrode connected to the first node N1.

Further optionally, the first transistor T1 is a metal oxide transistor. The metal oxide transistor has a small leakage current, such that it is possible to prevent the voltage at the first node N1 from leaking through the first transistor T1 during a light emitting phase.

Referring to FIGS. 1 and 3, in some embodiments, the second reset circuit 202 includes an eighth transistor T8. The eighth transistor T8 includes a control electrode connected to the second control signal terminal CS2, a first electrode connected to the second voltage supply terminal IN2, and a second electrode connected to the second node N2.

Referring to FIGS. 2 and 3, in some embodiments, the fourth reset circuit 203 includes a ninth transistor T9. The ninth transistor T9 includes a control electrode connected to the third control signal terminal CS3, a first electrode connected to the third voltage supply terminal IN3, and a second electrode connected to the third node N3.

Figure 4:
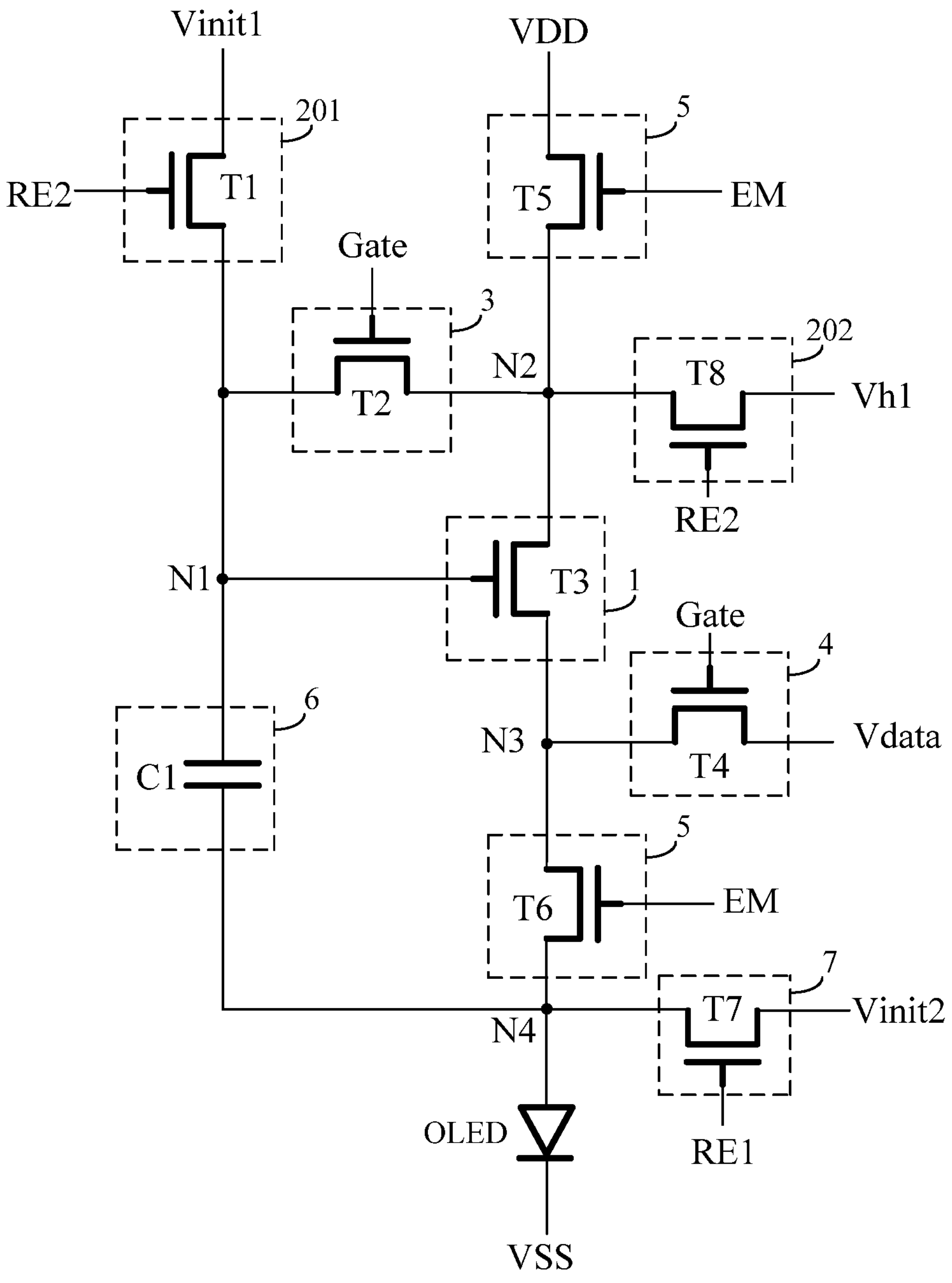
FIG. 4 is a schematic diagram of a circuit structure of another pixel driving circuit according to an embodiment of the present disclosure.
Figure 5:
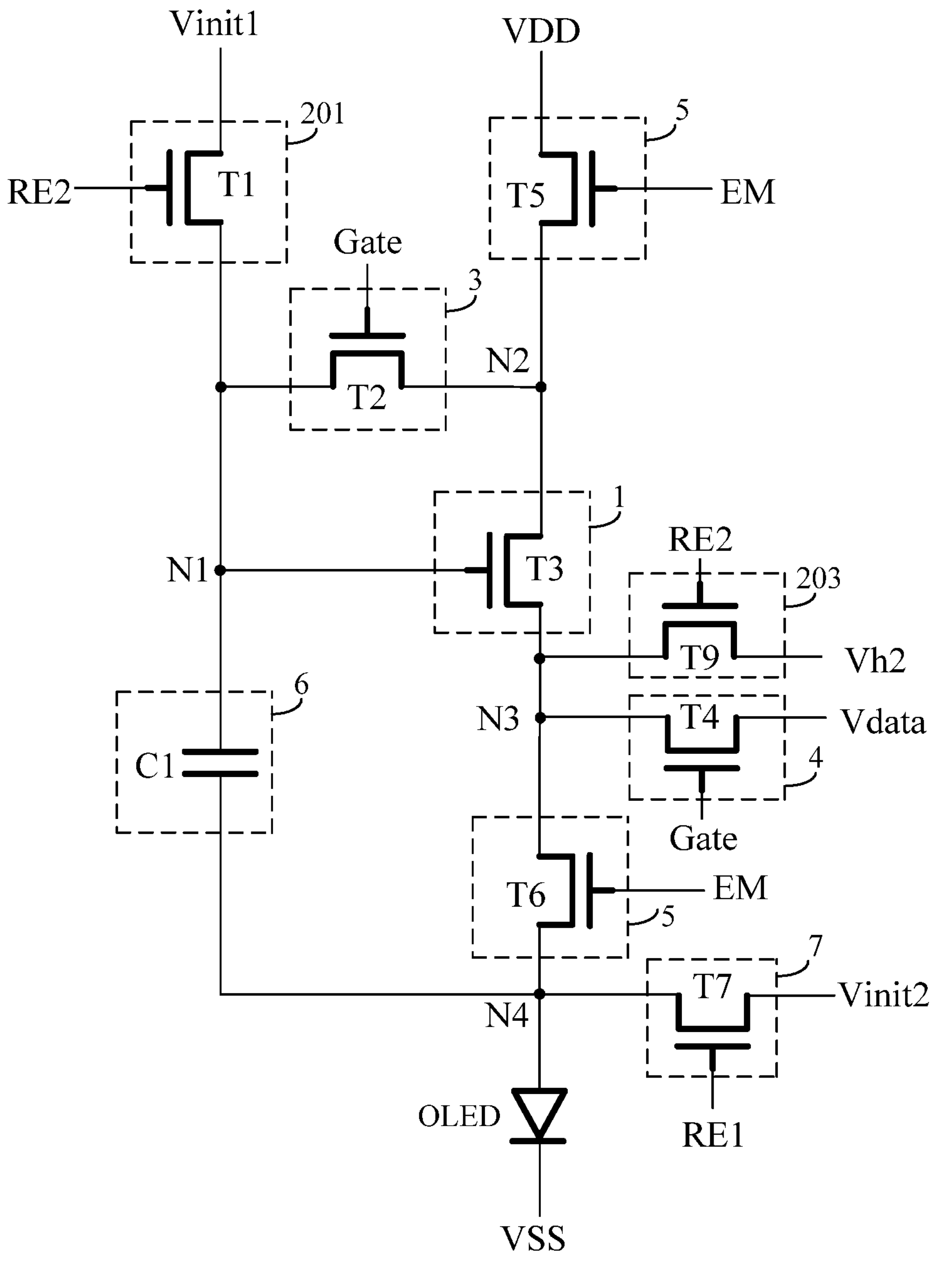
FIG. 5 is a schematic diagram of a circuit structure of another pixel driving circuit according to an embodiment of the present disclosure.
Figure 6:
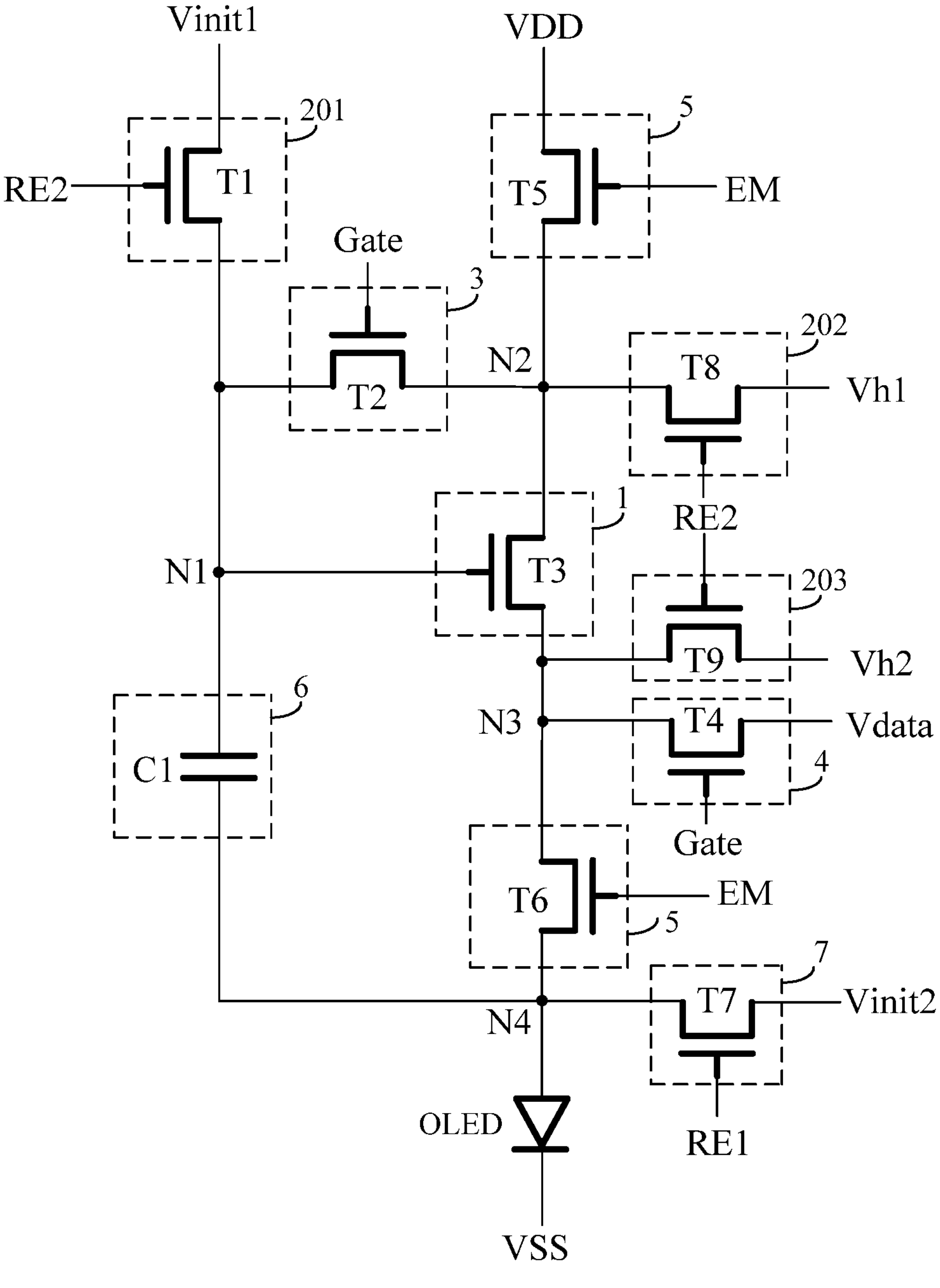
FIG. 6 is a schematic diagram of a circuit structure of another pixel driving circuit according to an embodiment of the present disclosure.

FIG. 4 is a schematic diagram of a circuit structure of another pixel driving circuit according to an embodiment of the present disclosure. FIG. 5 is a schematic diagram of a circuit structure of another pixel driving circuit according to an embodiment of the present disclosure. FIG. 6 is a schematic diagram of a circuit structure of another pixel driving circuit according to an embodiment of the present disclosure. As shown in FIGS. 4 to 6, FIG. 4 illustrates a case where the initialization circuit 2 includes the first reset circuit 201 and the second reset circuit 202, FIG. 5 illustrates a case where the initialization circuit 2 includes the first reset circuit 201 and the fourth reset circuit 203, and FIG. 6 illustrates a case where the initialization circuit 2 includes the first reset circuit 201, the second reset circuit 202, and the fourth reset circuit 203.

Referring to FIGS. 4 to 6, the first voltage supply terminal is connected to a first initialization voltage supply line, a first initialization voltage Vinit1 provided by the first initialization voltage supply line may reset the first node N1 in a reset phase, and the first control signal terminal is connected to a second reset control signal line.

Referring to FIGS. 4 and 6, the second voltage supply terminal is connected to a first reset voltage supply line, a first reset voltage Vh1 provided by the first reset voltage supply line may reset the second node N2 in a reset phase, and the second control signal terminal is connected to a second reset control signal line.

Referring to FIGS. 5 and 6, the third voltage supply terminal is connected to a second reset voltage supply line, and a second reset voltage Vh2 provided by the second reset voltage supply line may reset the third node N3 in a reset phase.

Taking the case where the driving transistor T3 is an N-type transistor as an example, the first electrode, which is connected to the second node N2, of the driving transistor T3 is a drain electrode, and the second electrode, which is connected to the third node N3, of the driving transistor T3 is a source electrode.

In the case shown in FIG. 4, after the initialization circuit 2 completes voltage writing in the reset phase, the voltage VN1 at the first node N1 is VN1=Vinit1, the voltage VN2 at the second node N2 is VN2=Vh1, and the voltage VN3 at the third node N3 is the data voltage written in the previous (e.g., immediately previous) frame, where Vinit1 is a high level voltage, Vinit1−Vdata_max>Vth, and Vdata_max is the maximum data voltage in a display panel. Optionally, a power supply voltage Vref may be equal to a power supply voltage VDD supplied from a second power supply terminal.

In this case, the gate-source voltage Vgs of the driving transistor T3 is Vgs=VN1-VN3, and Vgs is greater than the threshold voltage Vth of the driving transistor T3. The gate-drain voltage Vgd of the driving transistor T3 is Vgd=VN1−VN2=Vinit1−Vh1, and in order to make the driving transistor T3 operate in the saturation region, Vinit1−Vh1<Vth, i.e., Vh1>Vinit1−Vth should be satisfied.

In the case shown in FIG. 5, after the initialization circuit 2 completes the voltage writing in the reset phase, the voltage VN1 at the first node N1 is VN1=Vinit1, the voltage VN2 at the second node N2 maintains the state in the previous frame, i.e., VN2=VDD, where VDD is the power supply voltage provided by the second power supply terminal, and the voltage VN3 at the third node N3 is VN3=Vh2. The gate-source voltage Vgs of the driving transistor T3 is Vgs=VN1−VN3=Vinit1−Vh2, and the gate-drain voltage Vgd of the driving transistor T3 is Vgd=VN1−VN2=Vinit1−VDD. In order to make the driving transistor T3 operate in the saturation region, Vgs>Vth and Vgd<Vth should be satisfied, i.e., Vinit1<VDD+Vth and Vh2<Vinit1−Vth should be satisfied.

In the case shown in FIG. 6, after the initialization circuit 2 completes the voltage writing in the reset phase, the voltage VN1 at the first node N1 is VN1=Vinit1, the voltage VN2 at the second node N2 is VN2=Vh1, and the voltage VN3 at the third node N3 is VN3=Vh2. The gate-source voltage Vgs of the driving transistor T3 is Vgs=VN1−VN3=Vinit1−Vh2, and the gate-drain voltage Vgd of the driving transistor T3 is Vgd=VN1−VN2=Vinit1−Vh1. In order to make the driving transistor T3 operate in the saturation region, Vgs>Vth and Vgd<Vth should be satisfied, i.e., Vh1>Vinit1−Vth and Vh2<Vinit1−Vth should be satisfied.

Figure 7:
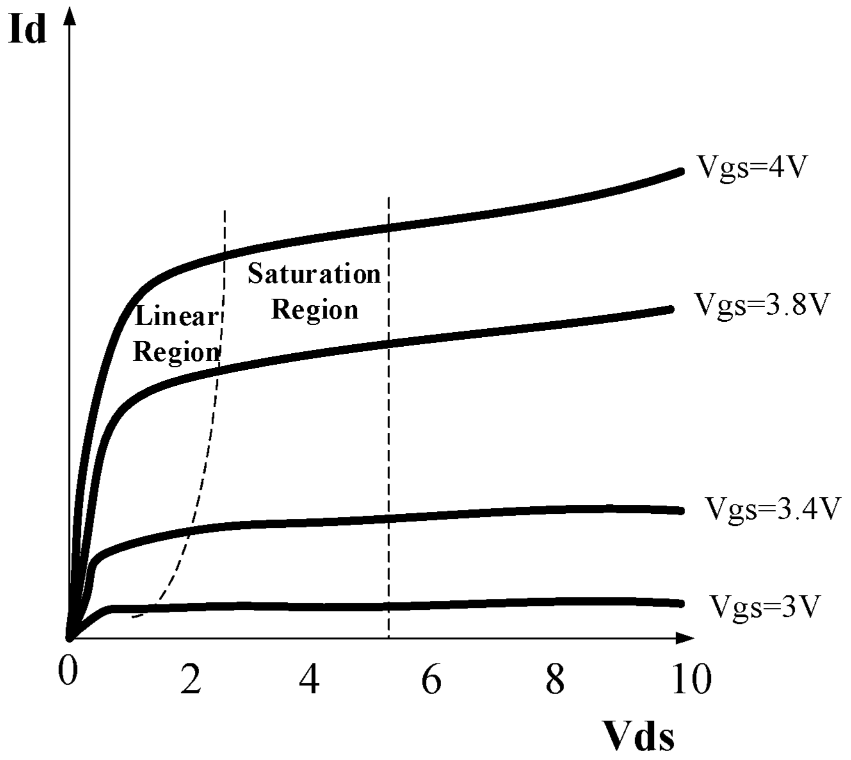
FIG. 7 shows graphs of output characteristics of a driving transistor at different gate-source voltages according to an embodiment of the present disclosure.

FIG. 7 shows graphs of output characteristics of the driving transistor at different gate-source voltages according to an embodiment of the present disclosure. As shown in FIG. 7, the horizontal axis denotes a drain-source voltage Vds of the driving transistor T3, and the vertical axis denotes a drain current Id output from the driving transistor T3. FIG. 7 shows graphs of output characteristics of the driving transistor T3 at different gate-source voltages Vgs of 3V, 3.4V, 3.8V and 4V. At a fixed gate-source voltage, the driving transistor T3 operates from being in a linear region to being in the saturation region with the increase of the drain-source voltage Vds, and a driving current output from the driving transistor T3 increases, such that the hysteresis readjustment capability of the driving transistor T3 can be increased.

Based on the graphs of output characteristics shown in FIG. 7, the value of Vh1−Vh2 may be set to be greater than 2V by designing the specific voltage values of Vh1 and Vh2. Apparently, the case shown in FIG. 7 is merely exemplary, and the technical solutions of the present disclosure is not limited thereto.

In a practical application, specific voltage values of Vinit1, Vh1 and Vh2 may be designed and adjusted according to actual requirements, and are not limited in the technical solutions of the present disclosure, as long as the driving transistor T3 is ensured to be in the turn-on state and operate in the saturation region in the reset phase.

With continuing reference to FIGS. 4 to 6, in some embodiments, the pixel driving circuit further includes a data writing circuit 4 and a threshold compensation circuit 3. The data writing circuit 4 is connected to a first preset node, a data signal terminal (that provides the data voltage Vdata), and a gate driving signal terminal Gate, and is configured to write the data voltage Vdata provided by the data signal terminal to the first preset node in response to control of a signal of the gate driving signal terminal Gate. The threshold compensation circuit 3 is connected to a second preset node, the first node N1 and the gate driving signal terminal, and is configured to connect the second preset node to the first node N1 in response to the control of the signal of the gate driving signal terminal Gate.

Further optionally, the threshold compensation circuit 3 includes a second transistor T2, and the data writing circuit 4 includes a fourth transistor T4. The second transistor T2 includes a control electrode connected to the gate driving signal terminal Gate, a first electrode connected to the first node N1, and a second electrode connected to the second preset node. The fourth transistor T4 includes a control electrode connected to the gate driving signal terminal Gate, a first electrode connected to the data signal terminal, and a second electrode connected to the first preset node.

It should be noted that FIGS. 4 to 6 show the case where the first preset node is the third node N3 and the second preset node is the second node N2.

With continuing reference to FIGS. 4 to 6, in some embodiments, the pixel driving circuit further includes a control circuit 5 and a coupling circuit 6. The control circuit 5 is connected to an enabling signal terminal EM, the second power supply terminal, the second node N2, the third node N3, and a fourth node N4, and is configured to transmit the power supply voltage supplied from the second power supply terminal to the second node N2 and connect the third node N3 to the fourth node N4, in response to control of a signal of the enabling signal terminal EM. The coupling circuit 6 is connected between the first node N1 and the fourth node N4.

The fourth node N4 is connected to a first terminal of a light emitting device OLED, and a second terminal of the light emitting device OLED is connected to a third power supply terminal that provides a power supply voltage VSS. The light emitting device according to the present disclosure refers to a current-driven light emitting element including an organic light emitting diode (OLED), a light emitting diode (LED), or the like. The embodiments of the present disclosure are described by taking an example in which the light emitting device is an OLED, and the first terminal and the second terminal of the light emitting device OLED refer to an anode and a cathode, respectively.

Further optionally, the control circuit 5 includes a fifth transistor T5 and a sixth transistor T6, and the coupling circuit 6 includes a capacitor C1. The fifth transistor T5 includes a control electrode connected to the enabling signal terminal EM, a first electrode connected to the second power supply terminal, and a second electrode connected to the second node N2. The sixth transistor T6 includes a control electrode connected to the enabling signal terminal EM, a first electrode connected to the third node N3, and a second electrode connected to the fourth node N4. The capacitor C1 includes a first terminal connected to the first node N1 and a second terminal connected to the fourth node N4.

With continuing reference to FIGS. 4 to 6, in some embodiments, the pixel driving circuit further includes a third reset circuit 7. The third reset circuit 7 is connected to a first reset control signal line RE1, a second initialization voltage supply line (that supplies the second initialization voltage Vinit2), and the fourth node N4, and is configured to transmit the second initialization voltage supplied from the second initialization voltage supply line to the fourth node N4 in response to control of a signal of the first reset control signal line RE1.

Further optionally, the third reset circuit 7 includes a seventh transistor T7. The seventh transistor T7 includes a control electrode connected to the first reset control signal line RE1, a first electrode connected to the second initialization voltage supply line, and a second electrode connected to the fourth node N4.

In some embodiments, the seventh transistor T7 is a metal oxide transistor to prevent a voltage at the fourth node N4 from leaking through the seventh transistor T7.

Figure 8:
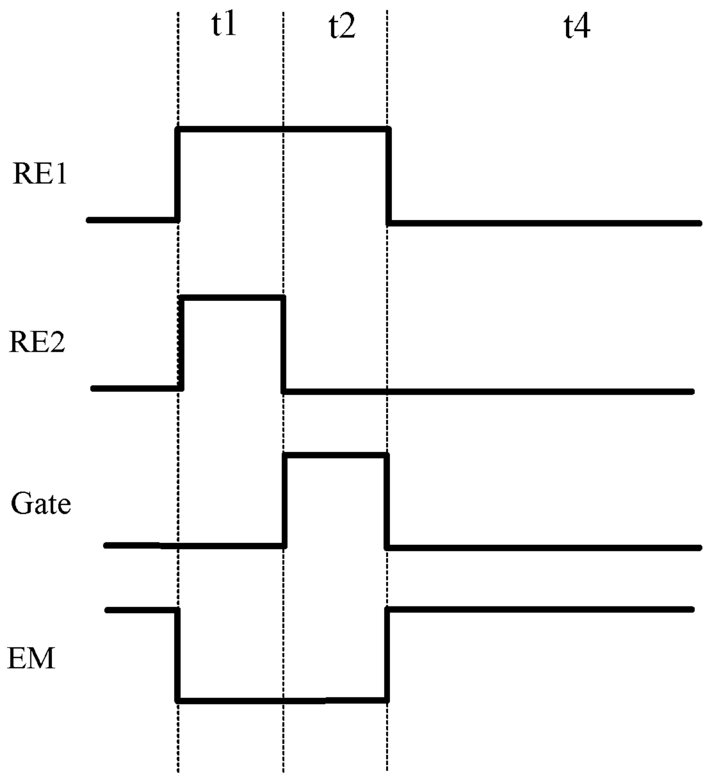
FIG. 8 is a timing diagram showing operations of a pixel driving circuit according to an embodiment of the present disclosure.

FIG. 8 is a timing diagram showing operations of a pixel driving circuit according to an embodiment of the present disclosure. As shown in FIG. 8, exemplary description will be given by taking an example in which each transistor of the pixel driving circuit is an N-type transistor and the pixel driving circuit is the pixel driving circuit shown in FIG. 6. An operation process of the pixel driving circuit shown in FIG. 6 includes the following reset phase t1, threshold compensation phase t2, and light emitting phase t4.

In the reset phase t1, the signal provided by the first reset control signal line RE1 is a high level signal, the signal provided by the second reset control signal line RE2 is a high level signal, the signal provided by the gate driving signal terminal Gate is a low level signal, and the signal provided by the enabling signal terminal EM is a low level signal. In this case, the first transistor T1, the seventh transistor T7, the eighth transistor T8, and the ninth transistor T9 are all turned on, and the second transistor T2, the fourth transistor T4, the fifth transistor T5, and the sixth transistor T6 are all turned off.

The first initialization voltage Vinit1 is transmitted to the first node N1 through the first transistor T1, the second initialization voltage Vinit2 is transmitted to the fourth node N4 through the seventh transistor T7, the first reset voltage Vh1 is transmitted to the second node N2 through the eighth transistor T8, and the second reset voltage Vh2 is transmitted to the third node N3 through the ninth transistor T9. Based on the foregoing description of FIG. 6, it is known that when the voltage VN1 at the first node N1 is VN1=Vinit1, the voltage VN2 at the second node N2 is VN2=Vh1 and the voltage VN3 at the third node N3 is VN3=Vh2, the driving transistor T3 is in the turn-on state and operates in the saturation region, such that the degree of the threshold voltage drift of the driving transistor T3 and the influence of the hysteresis effect can be effectively reduced, and the problems of ghosting and flickering of a display panel can be effectively improved.

In the threshold compensation phase t2, the signal provided by the first reset control signal line RE1 is a high level signal, the signal provided by the second reset control signal line RE2 is a low level signal, the signal provided by the gate driving signal terminal Gate is a high level signal, and the signal provided by the enabling signal terminal EM is a low level signal. In this case, the second transistor T2, the fourth transistor T4, and the seventh transistor T7 are all turned on, and the first transistor T1, the fifth transistor T5, the sixth transistor T6, the eighth transistor T8, and the ninth transistor T9 are all turned off.

The data voltage Vdata is written to the third node N3 through the fourth transistor T4, and since the second transistor T2 and the driving transistor T3 are both in the turn-on state, the voltages at the first node N1 and the second node N2 are discharged through the driving transistor T3 and the fourth transistor T4. Further, when the voltages at the first node N1 and the second node N2 drop to Vdata+Vth, the driving transistor T3 is turned off. In this case, a voltage difference between the two terminals of the capacitor C1 is VN1−VN4=Vdata+Vth−Vinit2.

In the light emitting phase t4, the signal provided by the first reset control signal line RE1 is a low level signal, the signal provided by the second reset control signal line RE2 is a low level signal, the signal provided by the gate driving signal terminal Gate is a low level signal, and the signal provided by the enabling signal terminal EM is a high level signal. In this case, the fifth transistor T5 and the sixth transistor T6 are both turned on, and the first transistor T1, the second transistor T2, the fourth transistor T4, the seventh transistor T7, the eighth transistor T8, and the ninth transistor T9 are all turned off.

Since both the first transistor T1 and the second transistor T2 are in a turn-off state, the first node N1 is in a floating state (i.e., is floating). The power supply voltage VDD is written to the second node N2 through the fifth transistor T5, the third node N3 and the fourth node N4 are connected to each other, and the voltage at the fourth node N4 is stabilized at VSS+Voled, where Voled is an operating voltage of the light emitting device OLED. Further, the voltage VN1 at the first node N1 is changed to Vdata+Vth−Vinit2+VSS+Voled by a bootstrapping effect of the capacitor C1. In this case, the gate-source voltage Vgs of the driving transistor T3 is Vgs=VN1−VN4=Vdata+Vth−Vinit2.

It should be noted that when the light emitting phase t4 is entered, the voltages at the first node N1 and the fourth node N4 will be changed, but a voltage difference between the first node N1 and the fourth node N4 is always maintained at Vdata+Vth−Vinit2, i.e., the voltage difference between the first node N1 and the fourth node N4 remains unchanged. That is, the gate-source voltage Vgs of the driving transistor T3 is always equal to Vdata+Vth−Vinit2.

The driving transistor T3 outputs a driving current I according to its own gate-source voltage, and the driving current I can be obtained as follows according to a formula of saturation driving current of the driving transistor T3:

$$\begin{aligned} I &= K*(Vgs - Vth)^2 \\ &= K*(Vdata + Vth - Vinit2 - Vth)^2 \\ &= K*(Vdata - Vinit2)^2 \end{aligned}$$

Where K is a constant (a magnitude of which is related to the electrical characteristics of the driving transistor T3). As can be seen from the above formula, the driving current output from the driving transistor T3 is only related to the data voltage Vdata and the second initialization voltage Vinit2, but is independent of the threshold voltage Vth of the driving transistor T3, such that the driving current flowing through the light emitting device can be prevented from being affected by the non-uniformity and the drift of the threshold voltage, thereby effectively improving the uniformity of the driving current flowing through the light emitting device.

Figure 9:
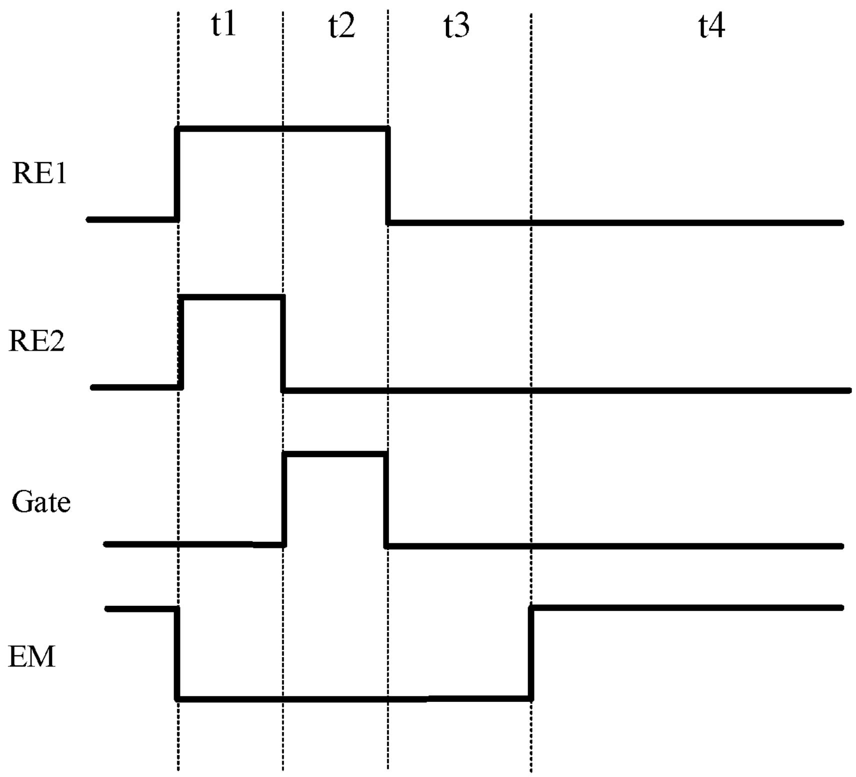
FIG. 9 is another timing diagram showing operations of a pixel driving circuit according to an embodiment of the present disclosure.

FIG. 9 is another timing diagram showing operations of the pixel driving circuit according to the embodiment of the present disclosure. Different from the timing diagram shown in FIG. 8, the timing diagram shown in FIG. 9 not only includes the reset phase t1, the threshold compensation phase t2 and the light emitting phase t4, but also includes a buffering phase t3 between the threshold compensation phase t2 and the light emitting phase t4. An operation process of the pixel circuit in the buffering phase only will be described in detail below.

In the buffering phase t3, the signal provided by the first reset control signal line RE1 is a low level signal, the signal provided by the second reset control signal line RE2 is a low level signal, the signal provided by the gate driving signal terminal Gate is a low level signal, and the signal provided by the enabling signal terminal EM is a low level signal. In this case, the first transistor T1, the second transistor T2, the fourth transistor T4, the fifth transistor T5, the sixth transistor T6, the seventh transistor T7, the eighth transistor T8, and the ninth transistor T9 are all turned off. By setting the buffering phase t3, a start time and an end time of light emitting of the light emitting device in a frame can be precisely controlled.

In a practical application, for the whole display panel, a time period in one frame may be divided into a driving phase and a stable display phase. In the driving phase, the pixel driving circuits in rows sequentially drive the light emitting devices connected thereto (i.e., the reset phase t1 and the threshold compensation phase t2 are performed), and in the stable display phase, all of the light emitting devices emit light simultaneously (i.e., all of the pixel driving circuits enter the light emitting phase t4 at the same time) to realize image display. As an exemplary example, the pixel driving circuits in other rows except the last row need to wait for the pixel driving circuits in the last row to complete the threshold compensation phase, to enter the light emitting phase. Therefore, the pixel driving circuits in other rows except the last row need to enter the buffering phase t3 after completing the threshold compensation phase t2, and then enter the light emitting phase t4, whereas pixel driving circuits in the last row may directly enter the light emitting phase t4 after completing the threshold compensation phase t2.

It should be noted that the pixel driving circuits shown in FIGS. 4 and 5 may also operate according to the timing diagram shown in each of FIGS. 8 and 9, and the detailed operation process thereof is not repeated herein.

Figure 10:
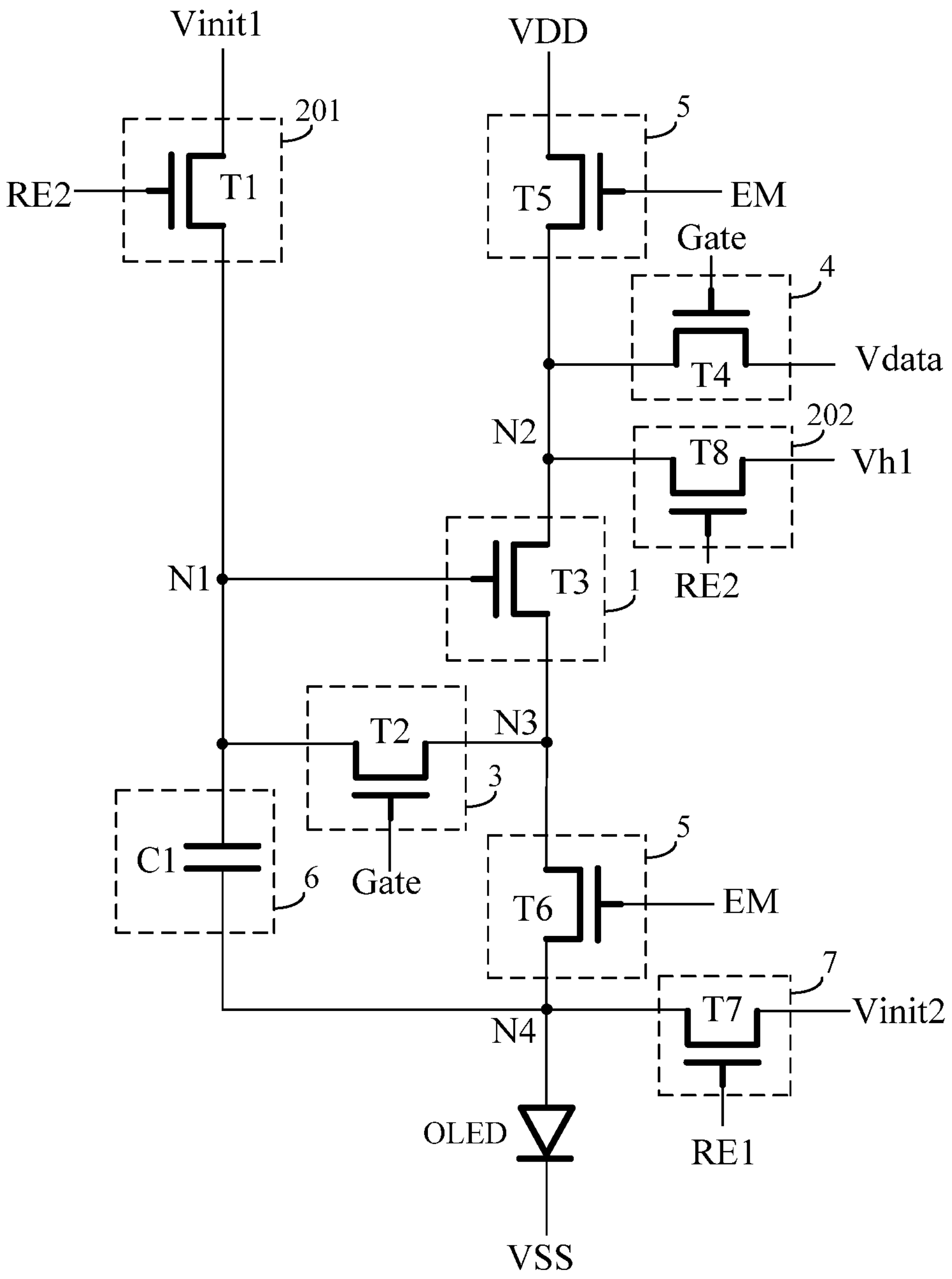
FIG. 10 is a schematic diagram of a circuit structure of another pixel driving circuit according to an embodiment of the present disclosure.
Figure 11:
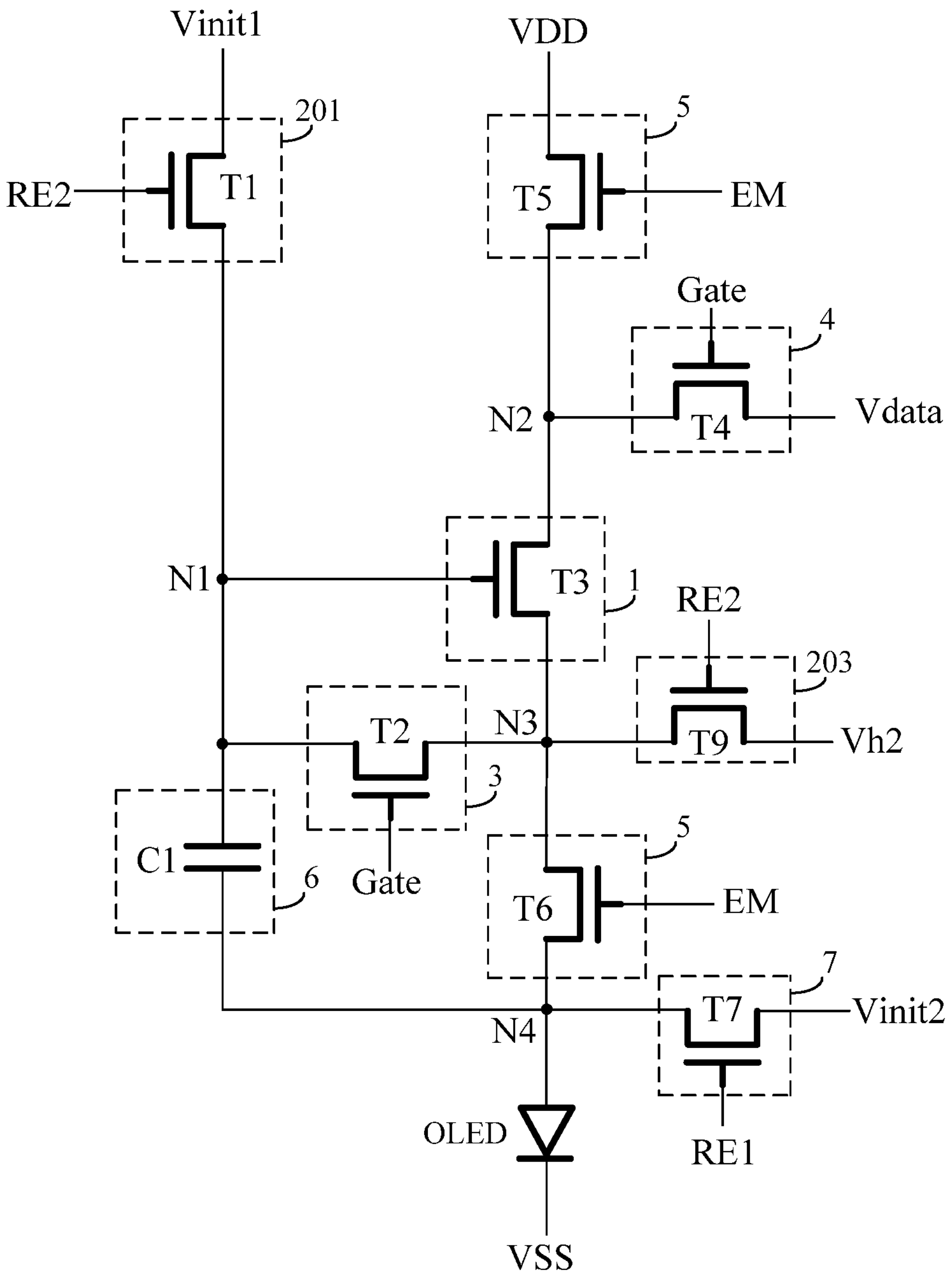
FIG. 11 is a schematic diagram of a circuit structure of another pixel driving circuit according to an embodiment of the present disclosure.
Figure 12:
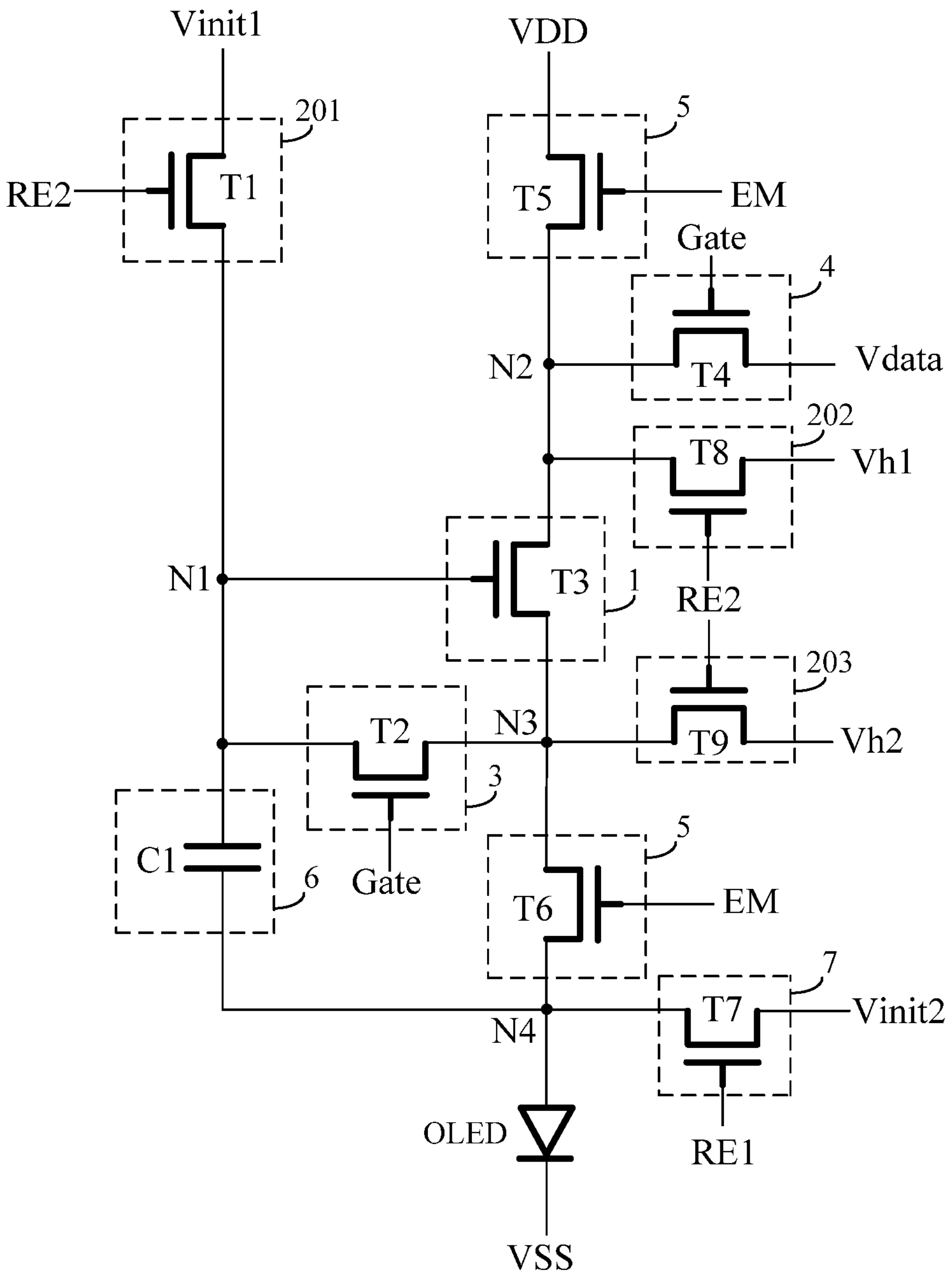
FIG. 12 is a schematic diagram of a circuit structure of another pixel driving circuit according to an embodiment of the present disclosure.

FIG. 10 is a schematic diagram of a circuit structure of another pixel driving circuit according to an embodiment of the present disclosure. FIG. 11 is a schematic diagram of a circuit structure of another pixel driving circuit according to an embodiment of the present disclosure, and FIG. 12 is a schematic diagram of a circuit structure of another pixel driving circuit according to an embodiment of the present disclosure. Different from the case where the first preset node is the third node N3 and the second preset node is the second node N2 as shown in FIGS. 4 to 6, in the case shown in FIGS. 10 to 12, the first preset node is the second node N2 and the second preset node is the third node N3. That is, the threshold compensation circuit 3 is connected between the first node N1 and the third node N3, and the data writing circuit 4 is connected to the second node N2.

It should be noted that the pixel driving circuit shown in each of FIGS. 10 to 12 may also operate according to the timing diagram shown in each of FIGS. 8 and 9, and the detailed operation process thereof is not repeated herein.

Figure 13:
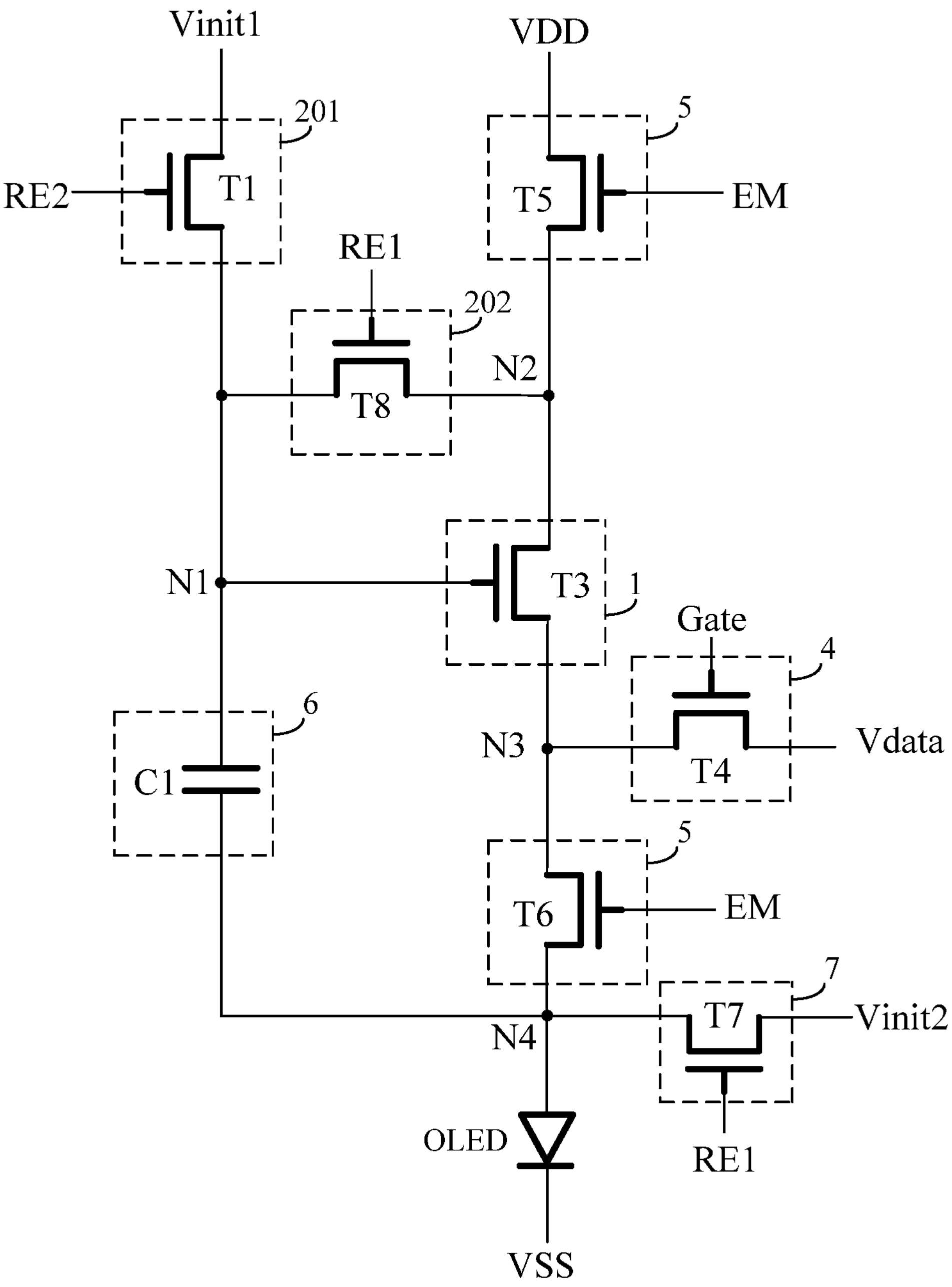
FIG. 13 is a schematic diagram of a circuit structure of another pixel driving circuit according to an embodiment of the present disclosure.

FIG. 13 is a schematic diagram of a circuit structure of another pixel driving circuit according to an embodiment of the present disclosure. Unlike the case where the second voltage supply terminal is connected to the first reset voltage supply line when the initialization circuit 2 includes the second reset circuit 202 in the foregoing embodiments, in the embodiment as shown in FIG. 13, the second voltage supply terminal is connected to the first node N1 when the initialization circuit 2 includes the second reset circuit 202; meanwhile, the first voltage supply terminal is connected to the first initialization voltage supply line, the first control signal terminal is connected to the second reset control signal line RE2, and the second control signal terminal is connected to the first reset control signal line RE1.

In this case, the second reset circuit 202 may be multiplexed as the threshold compensation circuit 3 according to each of the foregoing embodiments. That is, the second reset circuit 202 can not only reset the second node N2 but also perform threshold compensation on the driving transistor T3, such that the threshold compensation circuit 3 is not needed additionally, which is beneficial to simplifying the structure of the pixel driving circuit, reducing the number of transistors in the pixel driving circuit, reducing a space occupied by the pixel driving circuit, and facilitating a high resolution design of a product.

Referring to FIG. 13, in some embodiments, the pixel driving circuit further includes the data writing circuit 4. The data writing circuit 4 is connected to the third node N3, the data signal terminal, and the gate driving signal terminal Gate, and is configured to write the data voltage supplied from the data signal terminal to the third node N3 in response to control of a signal of (or at) the gate driving signal terminal Gate.

Further optionally, the data writing circuit 4 includes the fourth transistor T4, which has the control electrode connected to the gate driving signal terminal Gate, the first electrode connected to the data signal terminal, and the second electrode connected to the third node N3.

In some embodiments, the pixel driving circuit shown in FIG. 13 further includes the control circuit 5, the coupling circuit 6 and the third reset circuit 7, the detailed description of which may be referred to the related description of FIGS. 4 to 6 in the foregoing embodiments, and are not repeated herein.

An exemplary operation process of the pixel driving circuit shown in FIG. 13 will be described in detail below with reference to the accompanying drawings. Description will be given by taking an example where each transistor in the pixel driving circuit shown in FIG. 13 is the N-type transistor and the timing diagram shown in FIG. 8 is adopted. The operation process of the pixel driving circuit shown in FIG. 13 includes the following reset phase t1, threshold compensation phase t2, and light emitting phase t4.

In the reset phase t1, the signal provided by the first reset control signal line RE1 is a high level signal, the signal provided by the second reset control signal line RE2 is a high level signal, the signal provided by the gate driving signal terminal Gate is a low level signal, and the signal provided by the enabling signal terminal EM is a low level signal. In this case, the first transistor T1, the seventh transistor T7, and the eighth transistor T8 are all turned on, and the fourth transistor T4, the fifth transistor T5, and the sixth transistor T6 are all turned off.

The first initialization voltage Vinit1 is transmitted to the first node N1 through the first transistor T1, the second initialization voltage Vinit2 is transmitted to the fourth node N4 through the seventh transistor T7, the first initialization voltage Vinit1 is transmitted to the second node N2 through the eighth transistor T8 (i.e., the first initialization voltage Vinit1 serves as a first reset voltage to reset the second node N2), and a voltage at the third node N3 is the data voltage written to the third node N3 in the previous frame. When the voltage VN1 at the first node N1 is VN1=Vinit1, the voltage VN2 at the second node N2 is VN2=Vinit1, and the voltage VN3 at the third node N3 is the data voltage written to the third node N3 in the previous frame, the gate-source voltage Vgs of the driving transistor T3 is Vgs>Vth, and the gate-drain voltage Vgd of the driving transistor T3 is Vgd=0V.

That is, the driving transistor T3 is in the turn-on state and operates in the saturation region, such that the degree of the threshold voltage drift of the driving transistor T3 and the influence of the hysteresis effect can be effectively reduced, and therefore the problems of ghosting and flickering of a display panel can be effectively improved.

In the threshold compensation phase t2, the signal provided by the first reset control signal line RE1 is a high level signal, the signal provided by the second reset control signal line RE2 is a low level signal, the signal provided by the gate driving signal terminal Gate is a high level signal, and the signal provided by the enabling signal terminal EM is a low level signal. In this case, the fourth transistor T4, the seventh transistor T7, and the eighth transistor T8 are all turned on, and the first transistor T1, the fifth transistor T5, and the sixth transistor T6 are all turned off.

The data voltage Vdata is written to the third node N3 through the fourth transistor T4, and since the eighth transistor T8 and the driving transistor T3 are in the turn-on state, the voltages at the first node N1 and the second node N2 are discharged through the driving transistor T3 and the fourth transistor T4. Further, when the voltages at the first node N1 and the second node N2 drop to Vdata+Vth, the driving transistor T3 is turned off. In this case, a voltage difference between the two terminals of the capacitor C1 is VN1−VN4=Vdata+Vth−Vinit2.

In the light emitting phase t4, the signal provided by the first reset control signal line RE1 is a low level signal, the signal provided by the second reset control signal line RE2 is a low level signal, the signal provided by the gate driving signal terminal Gate is a low level signal, and the signal provided by the enabling signal terminal EM is a high level signal. In this case, the fifth transistor T5 and the sixth transistor T6 are both turned on, and the first transistor T1, the fourth transistor T4, the seventh transistor T7, the eighth transistor T8, and the ninth transistor T9 are all turned off.

Since both the first transistor T1 and the eighth transistor T8 are in the turn-off state, the first node N1 is in the floating state. The power supply voltage VDD is written to the second node N2 through the fifth transistor T5, the third node N3 and the fourth node N4 are connected to each other, and the voltage at the fourth node N4 is stabilized at VSS+Voled, where Voled is the operating voltage of the light emitting device OLED. Further, the voltage VN1 at the first node N1 is changed to Vdata+Vth−Vinit2+VSS+Voled by the bootstrapping effect of the capacitor C1. In this case, the gate-source voltage Vgs of the driving transistor T3 is Vgs=VN1−VN4=Vdata+Vth-Vinit2.

The driving transistor T3 outputs a driving current I according to its own gate-source voltage. Based on the foregoing description of the light emitting phase t4, it can be seen that the driving current output from the driving transistor T3 is independent of the threshold voltage Vth of the driving transistor T3, such that the influence of non-uniformity and drift of the threshold voltage on the driving current flowing through the light emitting device can be avoided, thereby effectively improving the uniformity of the driving current flowing through the light emitting device.

It should be noted that the pixel driving circuit shown in FIG. 13 may also operate according to the timing diagram shown in FIG. 9 (i.e., the buffering phase t3 between the threshold compensation phase t2 and the light emitting phase t4 may be further included), and the detailed description thereof is not repeated herein.

Figure 14:
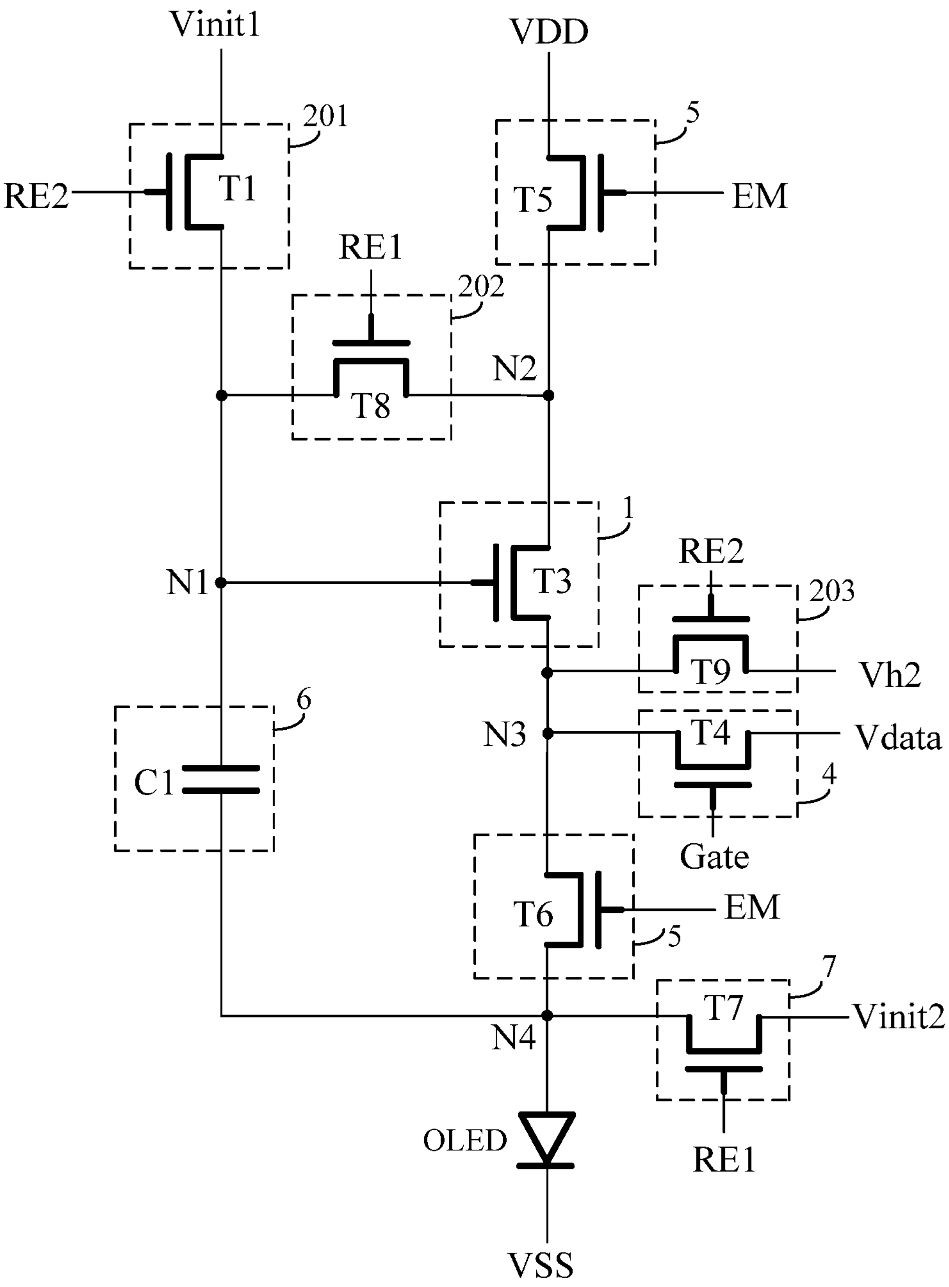
FIG. 14 is a schematic diagram of a circuit structure of another pixel driving circuit according to an embodiment of the present disclosure.

FIG. 14 is a schematic diagram of a circuit structure of another pixel driving circuit according to an embodiment of the present disclosure. The pixel driving circuit shown in FIG. 14 further includes the fourth reset circuit 203, in addition to the pixel driving circuit shown in FIG. 13, and the fourth reset circuit 203 may be configured to reset the third node N3 in the reset phase. The detailed description of the fourth reset circuit 203 in FIG. 14 may be referred to corresponding contents in the foregoing embodiments, and is not repeated here.

It should be noted that the pixel driving circuit shown in FIG. 14 may also operate according to the operational timing diagram shown in each of FIGS. 8 and 9, and the detailed process is not repeated here.

Figure 15:
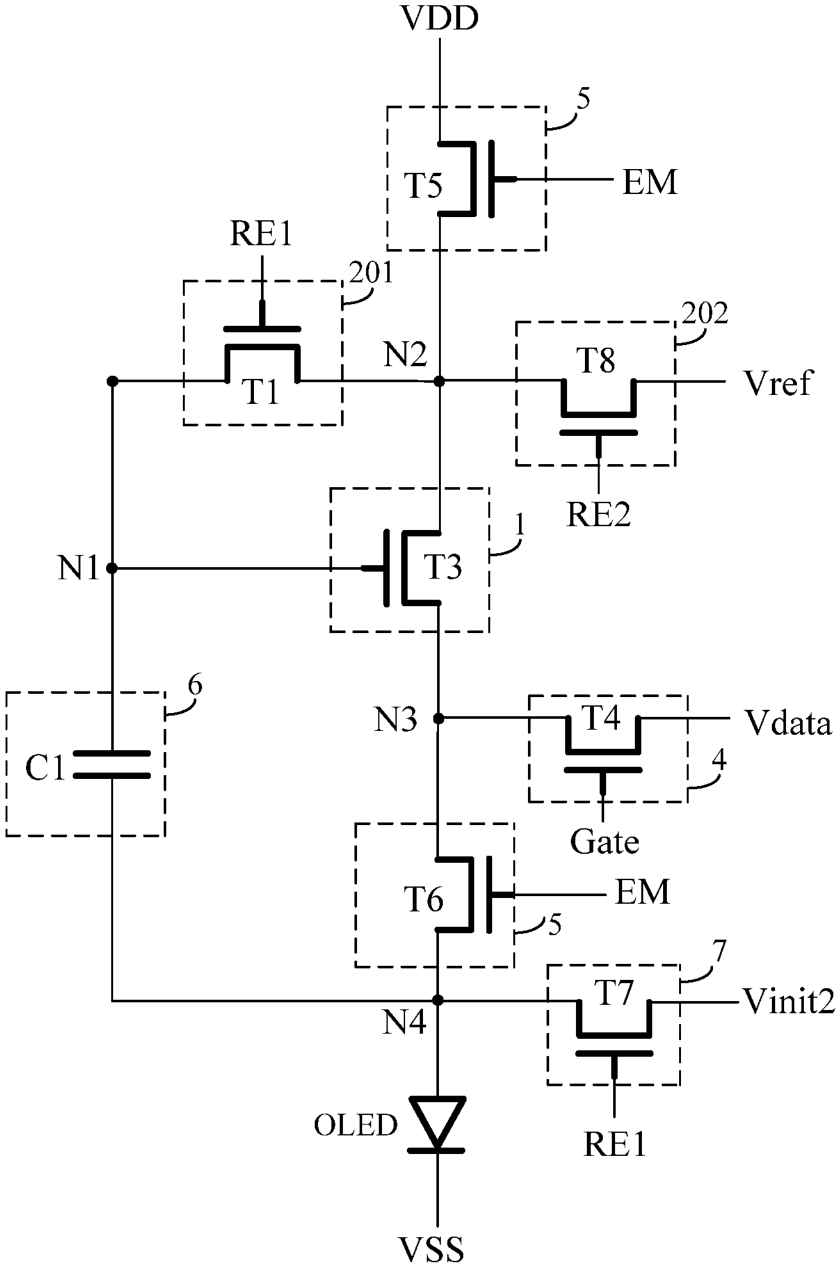
FIG. 15 is a schematic diagram of a circuit structure of another pixel driving circuit according to an embodiment of the present disclosure.

FIG. 15 is a schematic diagram of a circuit structure of another pixel driving circuit according to an embodiment of the present disclosure. Unlike the case where the first voltage supply terminal is connected to the first initialization voltage supply line and the first control signal terminal is connected to the second reset control signal line as shown in each of FIGS. 4-6 and 10-14, in the case shown in FIG. 15, the first voltage supply terminal is connected to the second node N2, and the first control signal terminal is connected to the first reset control signal line; the initialization circuit 2 includes the second reset circuit 202, the second voltage supply terminal is connected to a first power terminal, and the second control signal terminal is connected to the second reset control signal line. That is, the first reset circuit 201 is connected between the first node N1 and the second node N2, and the second reset circuit 202 is connected to the second node N2.

The first power supply terminal provides a power supply voltage Vref that is a high level voltage, and Vref−Vdata_max>Vth, where Vdata_max is the maximum data voltage in a display panel. Optionally, the power supply voltage Vref may be equal to the power supply voltage VDD, i.e., the first power supply terminal and the second power supply terminal may be a same power supply terminal (i.e., may be one single power supply terminal).

In this case, the first reset circuit 201 may be multiplexed as the threshold compensation circuit 3 in the foregoing embodiments. That is to say, the first reset circuit 201 can not only reset the first node N1, but also perform threshold compensation on the driving transistor T3, such that the threshold compensation circuit 3 is not needed to be additionally provided, which is beneficial to simplifying the structure of the pixel driving circuit, reducing the number of transistors in the pixel driving circuit, reducing the space occupied by the pixel driving circuit, and facilitating a high resolution design of a product.

In some embodiments, the first reset circuit 201 includes the first transistor T1, and the second reset circuit 202 includes the eighth transistor T8. In this case, the first transistor T1 includes the control electrode connected to the first reset control signal line, the first electrode connected to the second node N2, and the second electrode connected to the first node N1. The eighth transistor T8 includes the control electrode connected to the second reset control signal line, the first electrode connected to the first power supply terminal, and the second electrode connected to the second node N2.

In some embodiments, the pixel driving circuit shown in FIG. 15 further includes the data writing circuit 4, the control circuit 5, the coupling circuit 6, and the third reset circuit 7. The detailed descriptions of the data writing circuit 4, the control circuit 5, the coupling circuit 6, and the third reset circuit 7 may be referred to the related description of FIG. 13 in the foregoing embodiment, and is not repeated here.

An exemplary operation process of the pixel driving circuit shown in FIG. 15 will be described in detail below with reference to the accompanying drawings. Description will be given by taking an example where each transistor in the pixel driving circuit shown in FIG. 15 is the N-type transistor and the operational timing diagram shown in FIG. 8 is adopted. The operation process of the pixel driving circuit shown in FIG. 15 includes the following reset phase t1, threshold compensation phase t2, and light emitting phase t4.

In the reset phase t1, the signal provided by the first reset control signal line is a high level signal, the signal provided by the second reset control signal line is a high level signal, the signal provided by the gate driving signal terminal is a low level signal, and the signal provided by the enabling signal terminal is a low level signal. In this case, the first transistor T1, the seventh transistor T7, and the eighth transistor T8 are all turned on, and the fourth transistor T4, the fifth transistor T5, and the sixth transistor T6 are all turned off.

The power supply voltage Vref is transmitted to the second node N2 through the eighth transistor T8 (i.e., the power supply voltage Vref serves as the first reset voltage to reset the second node N2), and is transmitted to the first node N1 through the first transistor T1 (i.e., the power supply voltage Vref serves as the first initialization voltage to reset the first node N1). The second initialization voltage Vinit2 is transmitted to the fourth node N4 through the seventh transistor T7, and the voltage at the third node N3 is the data voltage written to the third node N3 in the previous frame. When the voltage VN1 at the first node N1 is VN1=Vref, the voltage VN2 at the second node N2 is VN2=Vref, and the voltage VN3 at the third node N3 is the data voltage written to the third node N3 in the previous frame, the gate-source voltage Vgs of the driving transistor T3 is Vgs>Vth, and the gate-drain voltage Vgd of the driving transistor T3 is Vgd=0V. That is, the driving transistor T3 is in the turn-on state and operates in the saturation region, such that the degree of the threshold voltage drift of the driving transistor T3 and the influence of the hysteresis effect can be effectively reduced, thereby effectively improving the problems of ghosting and flickering of a display panel.

In the threshold compensation phase t2, the signal provided by the first reset control signal line is a high level signal, the signal provided by the second reset control signal line is a low level signal, the signal provided by the gate driving signal terminal is a high level signal, and the signal provided by the enabling signal terminal is a low level signal. In this case, the first transistor T1, the fourth transistor T4, and the seventh transistor T7 are all turned on, and the fifth transistor T5, the sixth transistor T6, and the eighth transistor T8 are all turned off.

The data voltage Vdata is written to the third node N3 through the fourth transistor T4, and since the first transistor T1 and the driving transistor T3 are in the turn-on state, the voltages at the first node N1 and the second node N2 are discharged through the driving transistor T3 and the fourth transistor T4. Further, when the voltages at the first node N1 and the second node N2 drop to Vdata+Vth, the driving transistor T3 is turned off. In this case, the voltage difference between the two terminals of the capacitor C1 is VN1−VN4=Vdata+Vth−Vinit2.

In the light emitting phase t4, the signal provided by the first reset control signal line is a low level signal, the signal provided by the second reset control signal line is a low level signal, the signal provided by the gate driving signal terminal is a low level signal, and the signal provided by the enabling signal terminal is a high level signal. In this case, the fifth transistor T5 and the sixth transistor T6 are both turned on, and the first transistor T1, the fourth transistor T4, the seventh transistor T7, the eighth transistor T8, and the ninth transistor T9 are all turned off.

Since the first transistor T1 is in the turn-off state, the first node N1 is in the floating state. The power supply voltage VDD is written to the second node N2 through the fifth transistor T5, the third node N3 and the fourth node N4 are connected to each other, and the voltage at the fourth node N4 will be stabilized at VSS+Voled, where Voled is the operating voltage of the light emitting device OLED. Further, the voltage VN1 at the first node N1 is changed to Vdata+Vth−Vinit2+VSS+Voled by the bootstrapping effect of the capacitor C1. In this case, the gate-source voltage Vgs of the driving transistor T3 is Vgs=VN1−VN4=Vdata+Vth−Vinit2.

The driving transistor T3 outputs a driving current I according to its own gate-source voltage. Based on the foregoing description of the light emitting phase t4, it can be seen that the driving current output from the driving transistor T3 is independent of the threshold voltage Vth of the driving transistor T3, such that the influence of non-uniformity and drift of the threshold voltage on the driving current flowing through the light emitting device can be avoided, thereby effectively improving the uniformity of the driving current flowing through the light emitting device.

It should be noted that the pixel driving circuit shown in FIG. 15 may also operate according to the operational timing diagram shown in FIG. 9 (i.e., the buffering phase t3 is further included between the threshold compensation phase t2 and the light emitting phase t4), and the detailed process is not repeated here.

Figure 16:
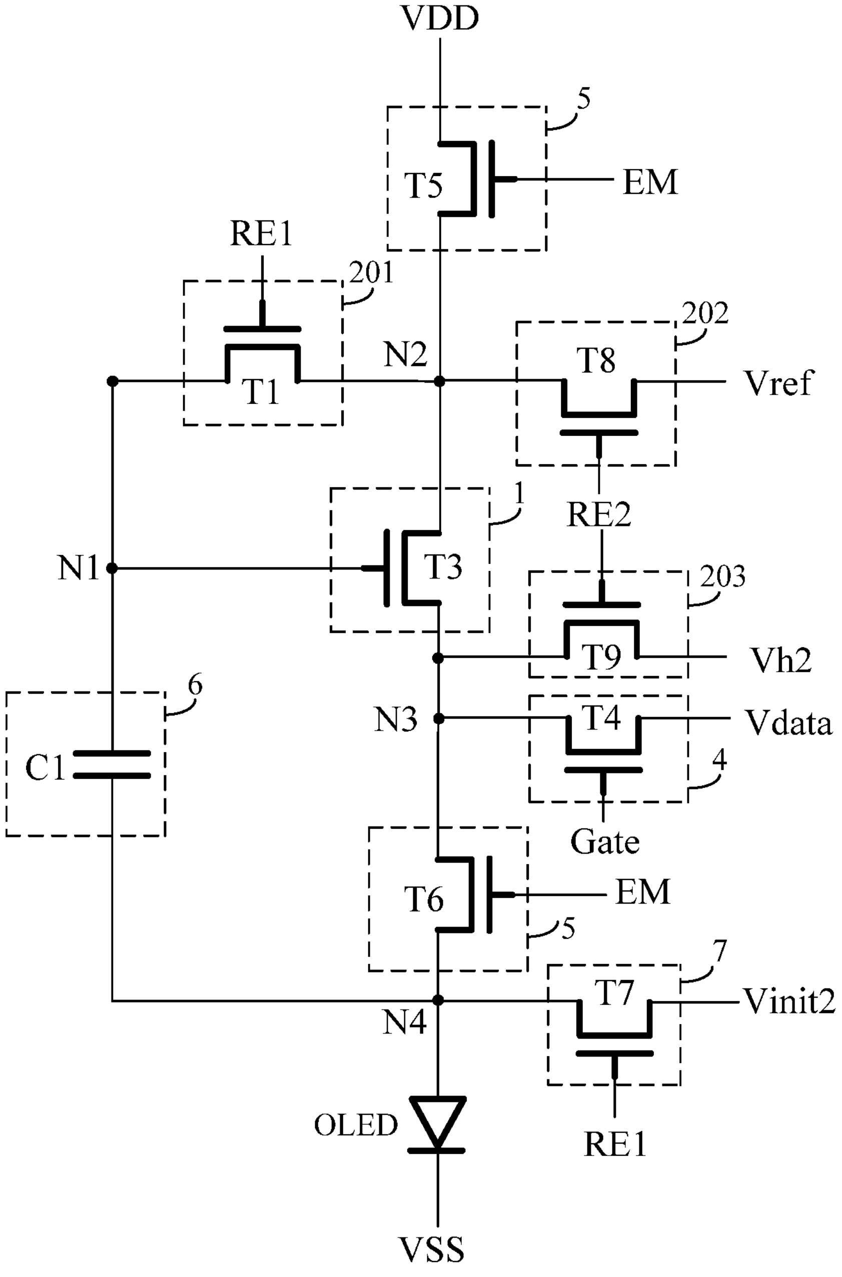
FIG. 16 is a schematic diagram of a circuit structure of another pixel driving circuit according to an embodiment of the present disclosure.

FIG. 16 is a schematic diagram of a circuit structure of another pixel driving circuit according to an embodiment of the present disclosure. The pixel driving circuit shown in FIG. 16 further includes the fourth reset circuit 203, in addition to the pixel driving circuit shown in FIG. 15, and the fourth reset circuit 203 may be configured to reset the third node N3 in the reset phase. The detailed description of the fourth reset circuit 203 in FIG. 16 may be referred to corresponding contents in the foregoing embodiments, and is not repeated here.

It should be noted that the pixel driving circuit shown in FIG. 16 may also operate according to the operational timing diagram shown in each of FIGS. 8 and 9, and the detailed process thereof is not repeated here.

Figure 17:
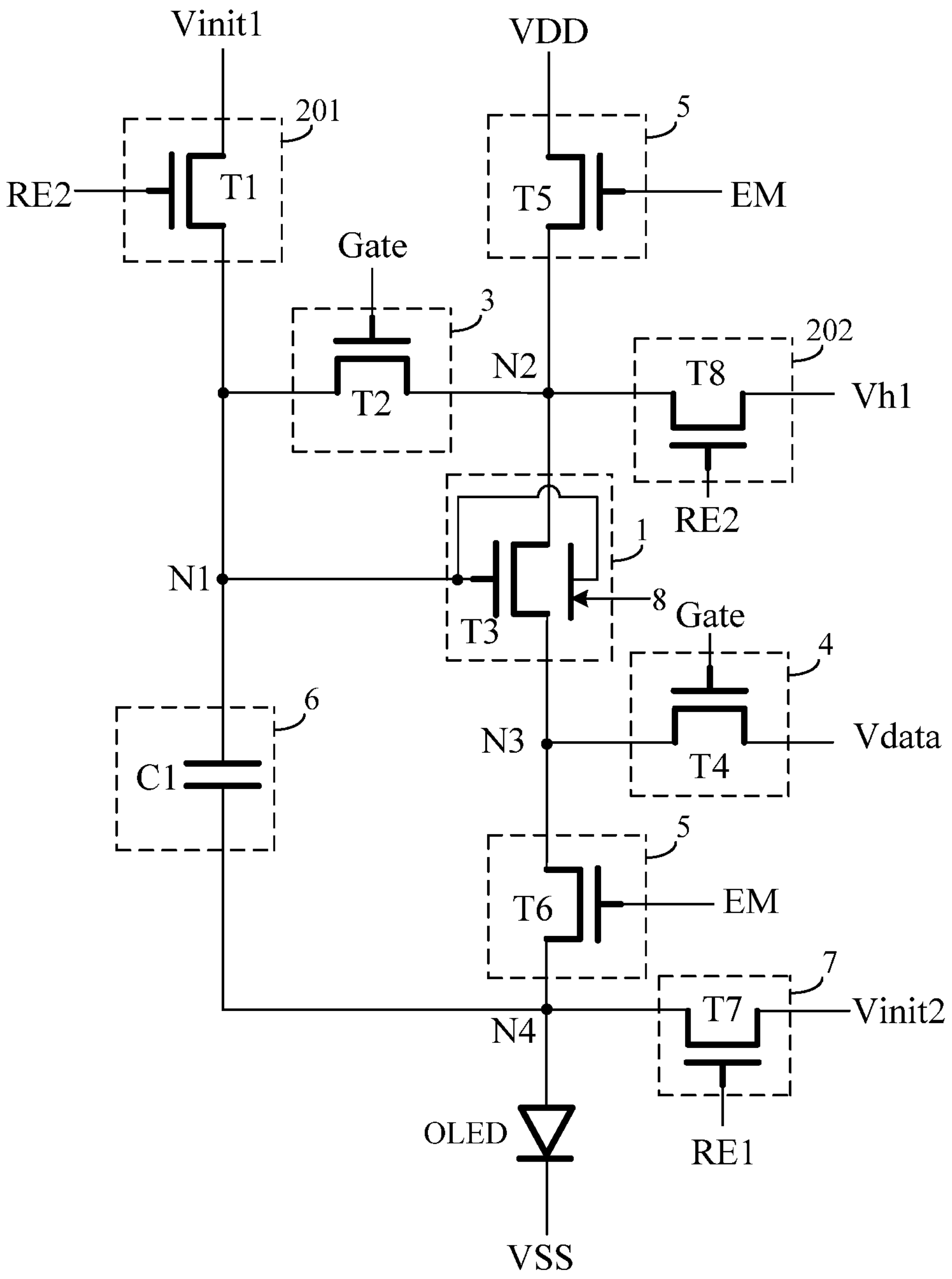
FIG. 17 is a schematic diagram of a circuit structure of another pixel driving circuit according to an embodiment of the present disclosure.
Figure 18:
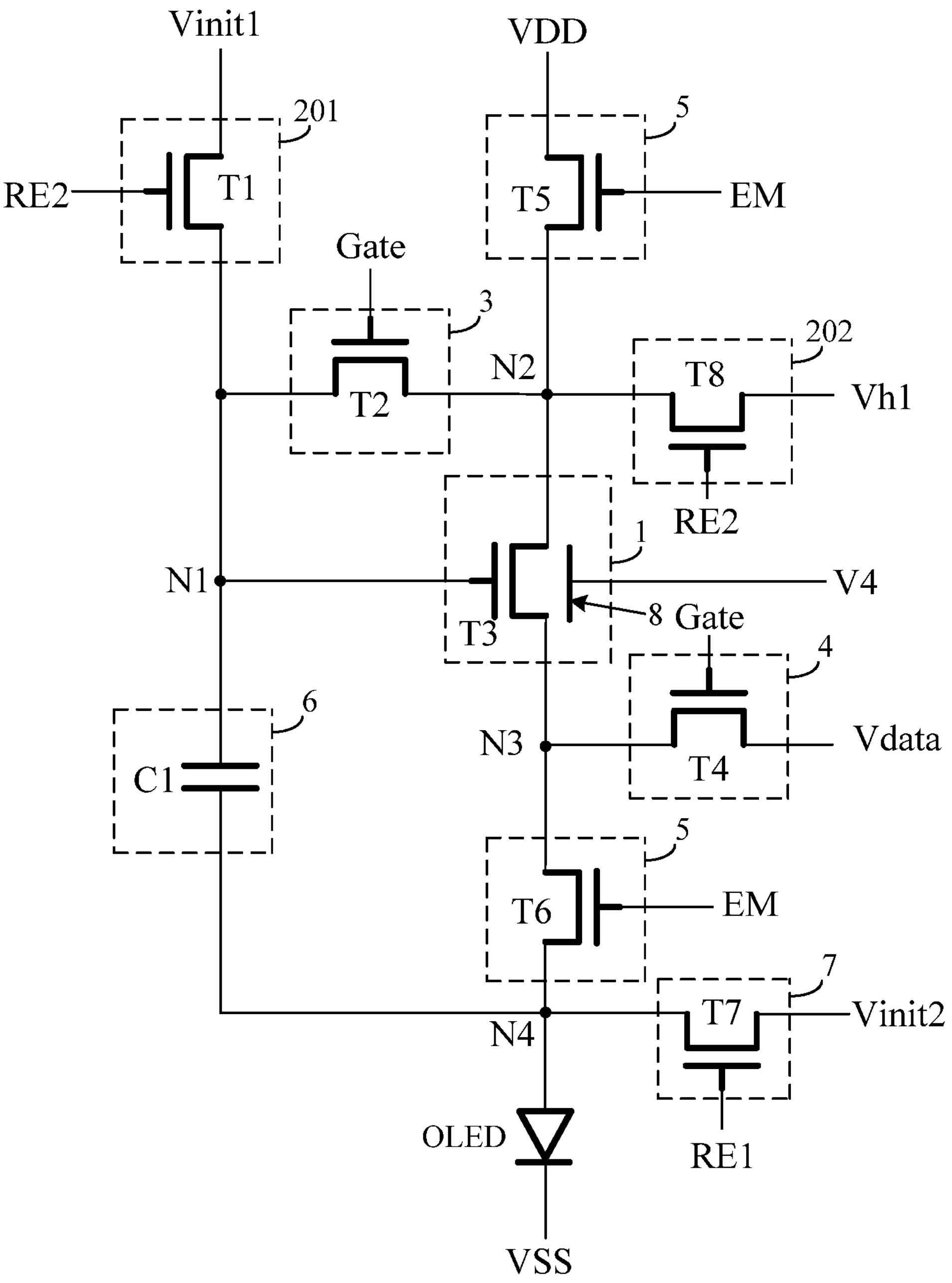
FIG. 18 is a schematic diagram of a circuit structure of another pixel driving circuit according to an embodiment of the present disclosure.

FIG. 17 is a schematic diagram of a circuit structure of another pixel driving circuit according to an embodiment of the present disclosure, and FIG. 18 is a schematic diagram of a circuit structure of another pixel driving circuit according to an embodiment of the present disclosure. As shown in FIGS. 17 and 18, in some embodiments, the driving transistor T3 is a top-gate type transistor, and the top-gate type transistor is configured with a conductive light shielding pattern 8. The conductive light shielding pattern 8 is located on a side, which is distal to the control electrode of the top-gate type transistor, of an active layer of the top-gate type transistor, and an orthogonal projection of the conductive light shielding pattern 8 on a plane where the active layer is located completely covers a channel region of the active layer. The conductive light shielding pattern 8 is connected to the control electrode of the top-gate type transistor (as shown in FIG. 17) or to a fourth power supply terminal (as shown in FIG. 18) that supplies a power supply voltage V4.

In the present embodiment, the conductive light shielding pattern has two functions, one of which is to block light and prevent water-oxygen erosion, and the other is that the conductive light shielding pattern may be connected to an electric potential to adjust the performance of the driving transistor T3.

As shown in FIG. 17, in the case where the conductive light shielding pattern is connected to the control electrode of the driving transistor T3, the voltage applied to the conductive light shielding pattern may vary according to the voltage at the control electrode of the driving transistor T3, and thus the driving current of the driving transistor T3 can be increased to a certain extent.

Referring to FIG. 18, in the case where the conductive light shielding pattern is connected to the fourth power supply terminal, the fourth power supply terminal may provide the conductive light shielding pattern with a fixed high level signal to adjust the number of electrons, which are captured by the control electrode, in the channel region of the driving transistor T3, thereby reducing the influence of the hysteresis effect. Alternatively, the fourth power supply terminal may provide the conductive light shielding pattern with a variable level signal, and for example, the fourth power supply terminal may provide the conductive light shielding pattern with a low level signal during the light emitting phase to increase a subthreshold of the driving transistor T3 for enhancing brightness control capacity at a low gray scale, whereas the fourth power supply terminal may provide the conductive light shielding pattern with a high level signal during the reset phase to reduce the influence of the hysteresis effect of the driving transistor T3.

It should be noted that the driving transistor T3 in each of FIGS. 4-6 and 10-16 may also be configured with the above-described conductive light shielding pattern, although the conductive light shielding pattern is not shown in these figures. In addition, in a practical application, other transistors in the pixel driving circuit may also be provided with respective conductive light shielding patterns according to actual requirements.

Based on the same inventive concept, the embodiments of the present disclosure further provide a method for driving the pixel driving circuit according to any one of the foregoing embodiments, and the method includes: in the reset phase, providing, by the initialization circuit, the first initialization voltage to the first node, while providing, by the initialization circuit, the first reset voltage to the second node and/or the second reset voltage to the third node, so as to control the driving transistor in the driving circuit to be turned on.

Detailed description of the method for driving the pixel driving circuit may be referred to the contents of the foregoing embodiments, and thus is not repeated here.

Based on the same inventive concept, the embodiments of the present disclosure further provide a display panel including the pixel driving circuit according to any one of the foregoing embodiments. Detailed description of the pixel driving circuit may be referred to corresponding contents in the foregoing embodiments, and thus is not repeated here.

The display panel according to the embodiments of the present disclosure may be any product or component with a display function, such as electronic paper, an OLED panel, a mobile phone, a tablet computer, a television, a display, a notebook computer, a digital photo frame, a navigator, or the like.

It will be understood that the foregoing embodiments are merely exemplary embodiments adopted to illustrate the principles of the present disclosure, and the present disclosure is not limited thereto. It will be apparent to one of ordinary skill in the art that various modifications and improvements may be made thereto without departing from the spirit and scope of the present disclosure, and such modifications and improvements are also considered to be within the scope of the present disclosure.

What is claimed is:

1. A pixel driving circuit, comprising: a driving circuit and an initialization circuit;

wherein the driving circuit is connected to a first node, a second node, and a third node;

wherein the initialization circuit is connected to the first node, the initialization circuit is further connected to the second node and/or the third node, and the initialization circuit is configured to provide a first initialization voltage to the first node, provide a first reset voltage to the second node and/or provide a second reset voltage to the third node, so as to control a driving transistor in the driving circuit to be turned on;

wherein a voltage difference between the first node and the third node is greater than a threshold voltage of the driving transistor, and a voltage difference between the first node and the second node is less than the threshold voltage of the driving transistor;

the pixel driving circuit further comprises a data writing circuit, and a control electrode of the data writing circuit is connected to a gate driving signal terminal;

the pixel driving circuit further comprises a third reset circuit, and a control electrode of the third reset circuit is connected to a first reset control signal line;

a control electrode of a first reset circuit of the initialization circuit is connected to a second reset control signal line;

during a time period of each frame, both a first time period in which the second reset control signal line provides a turn-on level signal and a second time period in which the gate driving signal terminal provides a turn-on level signal are within a third time period in which the first reset control signal line provides a turn-on level signal, wherein the first reset control signal line provides the turn-on level signal during the entirety of the third time period;

the pixel driving circuit further comprises a threshold compensation circuit;

wherein the data writing circuit is connected to a first preset node, a data signal terminal and the gate driving signal terminal, and configured to write a data voltage provided by the data signal terminal to the first preset node in response to control of a signal of the gate driving signal terminal;

wherein the threshold compensation circuit is connected to a second preset node, the first node and the gate driving signal terminal, and configured to connect the second preset node to the first node in response to the control of the signal of the gate driving signal terminal;

wherein one of the first preset node and the second preset node is the second node, and the other of the first preset node and the second preset node is the third node;

wherein the initialization circuit comprises the first reset circuit;

the first reset circuit is connected to a first control signal terminal, the first node, and a first voltage supply terminal, and configured to transmit the first initialization voltage provided from the first voltage supply terminal to the first node in response to control of a signal of the first control signal terminal;

the initialization circuit further comprises a second reset circuit and/or a fourth reset circuit;

the second reset circuit is connected to a second control signal terminal, the second node, and a second voltage supply terminal, and is configured to transmit the first reset voltage provided from the second voltage supply terminal to the second node in response to control of a signal of the second control signal terminal;

the fourth reset circuit is connected to a third control signal terminal, the third node, and a third voltage supply terminal, and is configured to transmit the second reset voltage provided from the third voltage supply terminal to the third node in response to control of a signal of the third control signal terminal;

wherein the first voltage supply terminal is connected to a first initialization voltage supply line, and the first control signal terminal is connected to the second reset control signal line;

in a case where the initialization circuit comprises the second reset circuit, the second voltage supply terminal is connected to a first reset voltage supply line, and the second control signal terminal is connected to the second reset control signal line; and in a case where the initialization circuit comprises the fourth reset circuit, the third voltage supply terminal is connected to a second reset voltage supply line, and the third control signal terminal is connected to the second reset control signal line.

2. The pixel driving circuit according to claim 1, wherein the driving circuit comprises the driving transistor; and the driving transistor comprises a control electrode connected to the first node, a first electrode connected to the second node, and a second electrode connected to the third node.

3. The pixel driving circuit according to claim 1, wherein the second reset circuit comprises an eighth transistor; and the eighth transistor comprises a control electrode connected to the second control signal terminal, a first electrode connected to the second voltage supply terminal, and a second electrode connected to the second node.

4. The pixel driving circuit according to claim 1, wherein the fourth reset circuit comprises a ninth transistor; and the ninth transistor comprises a control electrode connected to the third control signal terminal, a first electrode connected to the third voltage supply terminal, and a second electrode connected to the third node.

5. The pixel driving circuit according to claim 1, wherein the threshold compensation circuit comprises a second transistor, and the data writing circuit comprises a fourth transistor;

the second transistor comprises a control electrode connected to the gate driving signal terminal, a first electrode connected to the first node, and a second electrode connected to the second preset node; and the fourth transistor comprises a control electrode connected to the gate driving signal terminal, a first electrode connected to the data signal terminal, and a second electrode connected to the first preset node.

6. The pixel driving circuit according to claim 1, wherein the driving transistor is a top-gate type transistor, the top-gate type transistor is configured with a conductive light shielding pattern, the conductive light shielding pattern is located on a side, which is distal to a control electrode of the top-gate type transistor, of an active layer of the top-gate type transistor, and an orthogonal projection of the conductive light shielding pattern on a plane where the active layer is located completely covers a channel region of the active layer; and the conductive light shielding pattern is connected to the control electrode of the top-gate type transistor or a fourth power supply terminal.

7. A method for driving a pixel driving circuit, wherein the pixel driving circuit is the pixel driving circuit according to claim 1, and the method comprises:

in a reset phase, providing, by the initialization circuit, the first initialization voltage to the first node, while providing, by the initialization circuit, the first reset voltage to the second node and/or the second reset voltage to the third node, so as to control the driving transistor in the driving circuit to be turned on.

8. A display panel, comprising the pixel driving circuit according to claim 1.

9. The pixel driving circuit according to claim 1, wherein a difference between the first reset voltage and the second reset voltage is greater than 2V.

10. The pixel driving circuit according to claim 1, wherein the first voltage supply terminal is connected to the second node, and the first control signal terminal is connected to the first reset control signal line; the initialization circuit comprises the second reset circuit, the second voltage supply terminal is connected to a first power supply terminal, and the second control signal terminal is connected to the second reset control signal line.

11. The pixel driving circuit according to claim 1, wherein the first reset circuit comprises a first transistor; and the first transistor comprises a control electrode connected to the first control signal terminal, a first electrode connected to the first voltage supply terminal, and a second electrode connected to the first node.

12. The pixel driving circuit according to claim 11, wherein the first transistor is a metal oxide transistor.

13. The pixel driving circuit according to claim 1, wherein the first voltage supply terminal is connected to a first initialization voltage supply line, and the first control signal terminal is connected to the second reset control signal line; the initialization circuit comprises the second reset circuit, the second voltage supply terminal is connected to the first node, and the second control signal terminal is connected to the first reset control signal line.

14. The pixel driving circuit according to claim 13, wherein the data writing circuit is connected to the third node, a data signal terminal and the gate driving signal terminal, and is configured to write a data voltage provided by the data signal terminal to the third node in response to control of a signal of the gate driving signal terminal.

15. The pixel driving circuit according to claim 14, wherein the data writing circuit comprises a fourth transistor; and the fourth transistor comprises a control electrode connected to the gate driving signal terminal, a first electrode connected to the data signal terminal, and a second electrode connected to the third node.

16. The pixel driving circuit according to claim 1, further comprising a control circuit and a coupling circuit;

wherein the control circuit is connected to an enabling signal terminal, a second power supply terminal, the second node, the third node and a fourth node, and is configured to transmit a power supply voltage provided by the second power supply terminal to the second node and to connect the third node to the fourth node, in response to control of a signal of the enabling signal terminal; and wherein the coupling circuit is connected between the first node and the fourth node.

17. The pixel driving circuit according to claim 16, wherein the control circuit comprises a fifth transistor and a sixth transistor, and the coupling circuit comprising a capacitor;

the fifth transistor comprises a control electrode connected to the enabling signal terminal, a first electrode connected to the second power supply terminal, and a second electrode connected to the second node;

the sixth transistor comprises a control electrode connected to the enabling signal terminal, a first electrode connected to the third node, and a second electrode connected to the fourth node; and the capacitor comprises a first terminal connected to the first node, and a second terminal connected to the fourth node.

18. The pixel driving circuit according to claim 16, wherein the third reset circuit is connected to the first reset control signal line, a second initialization voltage supply line and the fourth node, and is configured to transmit a second initialization voltage supplied from the second initialization voltage supply line to the fourth node in response to control of a signal of the second reset control signal line.

19. The pixel driving circuit according to claim 18, wherein the third reset circuit comprises a seventh transistor; and the seventh transistor comprises a control electrode connected to the first reset control signal line, a first electrode connected to the second initialization voltage supply line, and a second electrode connected to the fourth node.

20. The pixel driving circuit according to claim 19, wherein the seventh transistor is a metal oxide transistor.

* * * * *